United States Patent
Yamashita et al.

(10) Patent No.: US 7,634,272 B2
(45) Date of Patent: Dec. 15, 2009

(54) MOBILE STATION, MOBILE COMMUNICATION SYSTEM, AND CELL SELECTION METHOD

(75) Inventors: Takeshi Yamashita, Yokosuka (JP); Hideo Matsuki, Yokosuka (JP); Jyunichirou Hagiwara, Yokohama (JP); Hidetoshi Kayama, Yokohama (JP); Narumi Umeda, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 590 days.

(21) Appl. No.: 10/686,609

(22) Filed: Oct. 17, 2003

(65) Prior Publication Data
US 2005/0037798 A1 Feb. 17, 2005

(30) Foreign Application Priority Data
Oct. 18, 2002 (JP) ............................ P2002-304748
Sep. 8, 2003 (JP) ............................ P2003-315652

(51) Int. Cl.
*H04W 36/00* (2009.01)
(52) U.S. Cl. ................. 455/444; 455/432.1; 455/435.2; 455/435.3; 455/437; 455/442
(58) Field of Classification Search ....... 455/432.1–446
See application file for complete search history.

(56) References Cited

U.S. PATENT DOCUMENTS

| | | | |
|---|---|---|---|
| 5,640,677 A | 6/1997 | Karlsson | |
| 7,085,564 B2* | 8/2006 | Nishiyama et al. | ....... 455/432.1 |
| 2001/0031638 A1* | 10/2001 | Korpela et al. | ............... 455/449 |
| 2004/0053626 A1* | 3/2004 | Yagi | ......................... 455/456.1 |
| 2004/1013102 * | 7/2004 | Tobe et al. | ................... 370/331 |

FOREIGN PATENT DOCUMENTS

| | | |
|---|---|---|
| JP | 9-307942 | 11/1997 |
| JP | 10-13908 | 1/1998 |
| JP | 10-191419 | 7/1998 |
| JP | 10-511237 | 10/1998 |
| JP | 2000-23229 | 1/2000 |
| JP | 2000-324529 | 11/2000 |
| JP | 3233854 | 12/2001 |
| JP | 2002-112301 | 4/2002 |

(Continued)

OTHER PUBLICATIONS

ETSI TS 125 304 V3.4.0, pp. 1-43, "Universal Mobile Telecommunications System (UMTS); UE Procedures in Idle Mode and Procedures for Cell Reselection in Connected Mode (3GPP TS 25.304 Version 3.4.0 Release 1999", Sep. 2000.

*Primary Examiner*—Edward Urban
*Assistant Examiner*—Fayyaz Alam
(74) *Attorney, Agent, or Firm*—Oblon, Spivak, McClelland, Maier & Neustadt, L.L.P.

(57) ABSTRACT

In mobile communication system 100 according to the present invention, mobile station 1 is camped on cell C10 established by base station B10. In the cell C10, there exist indoor cells C11-C13 and outdoor cells C21, C22 as neighboring cells. Mobile station 1 measures received levels of cells C10-C13, C21, C22 and determines cell types of the respective cells, i.e., whether each cell is an indoor cell or not, based on broadcast information M1. Mobile station 1 selects a cell as a reselection target on the basis of the received levels and cell types.

12 Claims, 14 Drawing Sheets

FOREIGN PATENT DOCUMENTS

| | | |
|---|---|---|
| JP | 2002-135825 | 5/2002 |
| JP | 3315869 | 8/2002 |
| JP | 2002-305762 | 10/2002 |
| WO | WO 96/19088 | 6/1996 |
| WO | WO 01/43462 A2 | 6/2001 |

* cited by examiner

| FIRST RESELECTION HYSTERESIS VALUE | ΔL(1) |
|---|---|
| SECOND RESELECTION HYSTERESIS VALUE | ΔL(2) |
| THIRD RESELECTION HYSTERESIS VALUE | ΔL(3) |

Fig.14

| RESELECTION CONDITION | SERVING CELL | NEIGHBORING CELL | DETAILS OF CELL RESELECTION CONDITION | PRIORITY |
|---|---|---|---|---|
| E11 | OUTDOOR CELL | OUTDOOR CELL | SELECT AS A TARGET CELL A NEIGHBORING CELL THE DIFFERENCE OF THE RECEIVED LEVEL OF WHICH FROM THAT OF THE SERVING CELL EXCEEDS THE PREDETERMINED HYSTERESIS AND WHICH HAS THE HIGHEST RECEIVED LEVEL | 3 |
| E12 | | INDOOR CELL | SELECT AS A TARGET CELL A NEIGHBORING CELL THE RECEIVED LEVEL OF WHICH IS KEPT HIGH FOR THE PREDETERMINED TIME | 1 |
| E13 | | MOBILE CELL | SELECT AS A TARGET CELL A NEIGHBORING CELL THE RECEIVED LEVEL OF WHICH IS KEPT HIGH FOR THE PREDETERMINED TIME | 2 |
| E21 | INDOOR CELL | OUTDOOR CELL | SELECT AS A TARGET CELL A NEIGHBORING CELL WITH THE HIGHEST RECEIVED LEVEL OUT OF NEIGHBORING CELLS SATISFYING THE PREDETERMINED RECEIVED LEVEL, WHEN THE RECEIVED LEVEL OF THE SERVING CELL BECOMES BELOW THE PREDETERMINED THRESHOLD | 3 |
| E22 | | INDOOR CELL | SELECT AS A TARGET CELL A NEIGHBORING CELL THE DIFFERENCE OF THE RECEIVED LEVEL OF WHICH FROM THAT OF THE SERVING CELL EXCEEDS THE PREDETERMINED HYSTERESIS AND WHICH HAS THE HIGHEST RECEIVED LEVEL | 1 |
| E23 | | MOBILE CELL | SELECT AS A TARGET CELL A NEIGHBORING CELL THE RECEIVED LEVEL OF WHICH IS KEPT HIGH FOR THE PREDETERMINED TIME | 2 |
| E31 | MOBILE CELL | OUTDOOR CELL | SELECT AS A TARGET CELL A NEIGHBORING CELL WITH THE HIGHEST RECEIVED LEVEL OUT OF NEIGHBORING CELLS SATISFYING THE PREDETERMINED RECEIVED LEVEL, WHEN THE RECEIVED LEVEL OF THE SERVING CELL BECOMES BELOW THE PREDETERMINED THRESHOLD | 1 |
| E32 | | INDOOR CELL | SELECT AS A TARGET CELL A NEIGHBORING CELL WITH THE HIGHEST RECEIVED LEVEL OUT OF NEIGHBORING CELLS SATISFYING THE PREDETERMINED RECEIVED LEVEL, WHEN THE RECEIVED LEVEL OF THE SERVING CELL BECOMES BELOW THE PREDETERMINED THRESHOLD | 2 |
| E33 | | MOBILE CELL | CONDUCT NO CELL RESELECTION BETWEEN MOBILE CELLS (PERFORM NO MEASUREMENT OF RECEIVED LEVEL OF NEIGHBORING MOBILE CELL) | - |

MOBILE STATION, MOBILE COMMUNICATION SYSTEM, AND CELL SELECTION METHOD

BACKGROUND OF THE INVENTION

1. Field of the Invention

The present invention relates to a mobile station, a mobile communication system, and a cell selection method.

2. Related Background Art

Conventionally, when a mobile station selects a cell as a reselection target, the mobile station measures a received level of a signal from a base station currently under communication therewith or a base station of a cell where the mobile station is camped, and received levels from base stations of neighboring cells. The mobile station compares the received levels and selects as a target cell a cell with the maximum received level from its base station, based on the result of the comparison (e.g., reference is made to Patent Document 1 and Patent Document 2).

The conventional cell selection method will be briefly described below with reference to FIG. 1. As shown in FIG. 1, mobile station 10 is camped on a cell C0 established by base station B0, and cells C1, C2, and C3 exist as cells neighbor to the cell C0. Mobile station 10 receives broadcast information M0 from base station B0 to acknowledge the existence of neighboring cells C1, C2, and C3. The broadcast information M0 is transmitted and received through a common broadcast channel or through a control channel individually dedicated to mobile station 10.

Mobile station 10 measures a received level L0 from base station B0, and received levels L1, L2, and L3 from the respective base stations B1, B2, and B3 forming the neighboring cells C1, C2, and C3. Thereafter, mobile station 10 compares the received level L0 with those L1, L2, and L3 and determines the propriety of a cell reselection. The comparison of the received levels is made, for example, using the following conditions (1) and (2).

$$\max(Li) = \max(L1, L2, L3) \quad (1)$$

$$\max(Li) > L0 + \Delta L \quad (2)$$

Here max(argument 1, argument 2, . . . ) represents a function that gives a maximum argument among argument 1, argument 2, . . . Furthermore, L0 indicates the received level of the serving cell and $\Delta L$ a reselection hysteresis value.

When condition (2) becomes true, mobile station 10 selects a neighboring cell corresponding to max(Li) as a target cell and implements a reselection of the cell. On the other hand, when condition (2) does not become true, mobile station 10 implements no cell reselection.

[Patent Document 1] Japanese Patent No. 3233854
[Patent Document 2] Japanese Patent No. 3315869 (p2 and FIG. 4)

SUMMARY OF THE INVENTION

Cells are generally classified under indoor cells and outdoor cells, according to installation locations and surrounding environments of base stations. In general, the indoor cells have smaller radii than the outdoor cells, and the indoor environments have less disturbance factors than the outdoor environments; therefore, the indoor cells are expected to stabilize good communication quality. However, the cell selection in the aforementioned prior art involves no consideration to whether a cell as a candidate for a reselection target is an indoor cell or an outdoor cell. For this reason, the mobile station can fail to select a cell optimal for communication. For example, the cells are sometimes classified under three or more cell types like nanocells, macrocells, and microcells according to their cell radii.

An object of the present invention is, therefore, to enable a mobile station to select a cell optimal for communication as a target cell, where the cells are classified under multiple types.

In order to solve the above problem, a mobile station according to the present invention comprises measuring means for measuring received levels of a serving cell and each neighboring cell thereto; determining means for determining cell types of the current and neighboring cells; and selecting means for selecting a cell as a reselection target, based on the received levels measured by the measuring means and the cell types determined by the determining means.

A cell selection method according to the present invention comprises a measuring step wherein measuring means of a mobile station measures received levels of a serving cell and each neighboring cell thereto; a determining step wherein determining means of the mobile station determines cell types of the current and neighboring cells; and a selecting step wherein selecting means of the mobile station selects a cell as a reselection target, based on the received levels measured by the measuring means and the cell types determined by the determining means.

Here the selection of the target cell includes selection of a cell as a target candidate, of course, and also includes determination on the propriety of a reselection of the cell. Therefore, even if a cell as a target candidate is selected, where the cell is determined not to be an optimal cell as a reselection target, the mobile station can continuously camp in the current source cell without executing the candidate reselection of the cell.

According to these aspects of the invention, the received levels of the serving cell and each neighboring cell thereto are measured, the cell types of the current and neighboring cells are determined, and thereafter the target cell is selected based on the received levels and the cell types. Namely, in the selection of the target cell including the determination on the propriety of the reselection, the mobile station selects the cell while taking into account not only the received levels in the current and neighboring cells, but also attributes of the respective cells. For example, the mobile station selects as a target cell an indoor cell classified in the cell type of the high received level. Since the indoor cell has the high received level and can stabilize good communication quality at the mobile station, the reselection of the selected cell permits the mobile station to perform low-power and high-speed communication. Namely, the selection of the target cell based on the received levels and the cell types enables the mobile station to select the cell optimal for communication.

In the mobile station according to the present invention, preferably, the selecting means changes a cell reselection condition or priority for selection between cell types, according to the cell type of the serving cell determined by the determining means.

In the cell selection method according to the present invention, preferably, the selecting step is configured so that the selecting means changes a cell reselection condition, according to the cell type of the serving cell determined by the determining means.

According to these aspects of the invention, the cell reselection condition is changed according to the cell type of the serving cell. For example, where the mobile station is now camped on an indoor cell, the continuous residence in the serving cell is more likely to stabilize good communication quality, rather than where the mobile station stays in an outdoor cell. In this case, therefore, the condition for the cell reselection is set tight to restrain the reselection so that no reselection is carried out unless a better cell is present in the surrounding area. As a consequence, it becomes feasible for the mobile station to select a cell optimal for communication as a target cell.

In the mobile station according to the present invention, preferably, the selecting means changes a cell reselection condition or priority for selection between cell types, according to the cell type of the neighboring cell determined by the determining means.

In the cell selection method according to the present invention, preferably, the selecting step is configured so that the selecting means changes a cell reselection condition, according to the cell type of the neighboring cell determined by the determining means.

According to these aspects of the invention, the cell reselection condition is changed according to the cell type of the neighboring cell. For example, where the neighboring cell as a candidate for the target cell is an indoor cell, the reselection of the mobile station thereto is more likely to stabilize good communication quality, than where the neighboring cell is an outdoor cell. In this case, therefore, the condition for the reselection of the cell is loosed so as to promote the reselection of the better cell. As a consequence, it becomes feasible for the mobile station to select the cell optimal for communication as a target cell.

The mobile station according to the present invention, more preferably, comprises storing means for storing the cell types in relation with cell classes; counting means for counting the number of reselections between cells of different cell classes; and changing means for changing the relation between the cell types and the cell classes in the storing means to another when the number of reselections counted by the counting means exceeds a predetermined value.

The cell selection method according to the present invention, more preferably, comprises a counting step wherein counting means counts the number of reselections between cells of different cell classes; and a changing step wherein changing means changes a relation between the cell types and the cell classes in storing means to another when the number of reselections counted by the counting means exceeds a predetermined value.

According to these aspects of the invention, the cell types are stored in relation with the cell classes in the storing means and the number of reselections between cells of different cell classes is counted. When the number of reselections exceeds the predetermined value, the relation between cell types and cell classes is changed. These aspects of the invention are presented for clearing the concern that highly frequent reselections can cause discontinuation of data transmission to decrease the data transmission rates to the mobile station. When the number of reselections exceeds the predetermined value, it is determined that the frequency of reselections of the mobile station is too high, and the relation (correspondence) between cell types and cell classes is changed to another.

This results in, for example, changing the cell class of indoor cells having belonged heretofore to a priority cell class, into a nonpriority cell class and changing the cell class of outdoor cells having belonged heretofore to the nonpriority cell class, into the priority cell class. Namely, the cell classes are changed. In conjunction with the change of the cell classes, the conditions for the cell reselection also change to make the condition for the cell reselection tight even in the case where the mobile station is camped on an outdoor cell. Therefore, the frequency of cell reselections is restricted, thereby eliminating the concern of the decrease in the data transmission rates to the mobile station.

In the mobile station according to the present invention, more preferably, the changing means changes the relation between the cell types and the cell classes in the storing means to another when the number of reselections exceeds the predetermined value within a predetermined time from a point of a start of counting the number of reselections.

In the cell selection method according to the present invention, more preferably, the changing step is configured so that the changing means changes the relation between the cell types and the cell classes in the storing means to another when the number of reselections exceeds the predetermined value within a predetermined time from a point of a start of counting the number of reselections.

According to these aspects of the invention, the changing of the relation between cell types and cell classes is limited to cases where the number of reselections exceeds the predetermined value within the predetermined time from the point of the start of counting. Namely, where the predetermined time has elapsed after the time of initializing the number of cell reselections, the number of reselections is again initialized to 0, regardless of the number of reselections at that point. This makes the changing of the relation and, besides, the determination on the cell reselection more properly reflect the number of cell reselections (the frequency of cell reselections) within the predetermined time.

In the mobile station according to the present invention, more preferably, the changing means is configured so that, on the occasion of changing the relation between the cell types and the cell classes, the changing means brings the relation back to that before the changing after a lapse of a predetermined time from a point of the changing.

In the cell selection method according to the present invention, more preferably, the changing step is configured so that, on the occasion of changing the relation between the cell types and the cell classes, the changing means brings the relation back to that before the changing after a lapse of a predetermined time from a point of the changing.

According to these aspects of the invention, where the relation between cell types and cell classes is changed to another, the changed relation is brought back to that before the changing after a lapse of the predetermined time from the changing point. Namely, after the relation after the changing is maintained for the predetermined time from the starting point when the relation between cell types and cell classes was changed, the relation between cell types and cell classes is forcedly brought back to that before the changing. This permits the relation before the changing to be used again for the determination on the cell reselection, where the frequency of cell reselections becomes lower after the changing of the cell classes than before.

In the mobile station according to the present invention, as described previously, the cell types are, for example, information indicating that each cell is either an indoor cell or an outdoor cell.

In the cell selection method according to the present invention, the cell types are, for example, information indicating whether each cell is either an indoor cell or an outdoor cell.

A mobile communication system according to the present invention comprises a mobile station comprising measuring means for measuring received levels of a serving cell and each neighboring cell thereto, determining means for determining cell types of the current and neighboring cells, and selecting means for selecting a cell as a reselection target, based on the received levels measured by the measuring means and the cell types determined by the determining means; and a base station for notifying the mobile station of information enabling identification of a cell type of its own cell or identification of cell types of its own cell and each neighboring cell thereto.

According to the present invention, the mobile station can determine the cell types of the respective cells (e.g., whether or not an indoor cell) as to the current and neighboring cells, based on the above information notified of by the base station. The mobile station selects the target cell with reference to the determination result and the received levels, whereby it can select the cell optimal for communication.

In order to solve the above problem, another mobile station according to the present invention comprises storing means for storing information about radio channels; choosing means for choosing neighboring cells for each of which a received level is measured; measuring means for measuring received levels of a serving cell and each neighboring cell after chosen by the choosing means, out of the neighboring cells to the serving cell; determining means for determining cell types of the current and chosen neighboring cells; and selecting means for selecting a cell as a reselection target, based on the received levels measured by the measuring means and the cell types determined by the determining means.

Another cell selection method according to the present invention comprises a storing step wherein storing means of a mobile station stores information about radio channels; a choosing step wherein choosing means of the mobile station chooses neighboring cells for each of which a received level is measured; a measuring step wherein measuring means of the mobile station measures received levels of a serving cell and each neighboring cell after chosen by the choosing means, out of neighboring cells to the serving cell; a determining step wherein determining means of the mobile station determines cell types of the current and chosen neighboring cells; and a selecting step wherein selecting means of the mobile station selects a cell as a reselection target, based on the received levels measured by the measuring means and the cell types determined by the determining means.

Here the selection of the target cell includes selection of a cell as a reselection target candidate, of course, and also includes determination on the propriety of a reselection of the cell. Therefore, even if a cell as a target candidate is selected, where the cell is determined not to be an optimal cell as a reselection target, the mobile station can continuously camp in the current source cell without executing the reselection of the selected cell.

According to these aspects of the invention, the received levels of the serving cell and each neighboring cell thereto are measured, the cell types of the respective cells of the current and neighboring cells are determined, and thereafter the target cell is selected based on the received levels and the cell types. Namely, on the occasion of selecting the target cell, the mobile station selects the target cell while taking into account not only the received levels in the current and neighboring cells, but also attributes of the respective cells. For example, where the mobile station moves into a train forming a mobile cell, the mobile station selects the mobile cell as a target cell. Since better communication quality is ensured in the mobile cell than in the outdoor and indoor cells, the reselection into the selected cell makes it feasible for the mobile station to perform low-power and high-speed communication. Namely, the selection of the target cell based on the received levels and cell types permits the mobile station to select the cell optimal for communication.

In the mobile station according to the present invention, preferably, the selecting means changes a cell reselection condition or priority for selection between cell types, according to the cell type of the serving cell determined by the determining means.

In the mobile station according to the present invention, more preferably, the selecting means changes the cell reselection condition, according to the cell type of the neighboring cell determined by the determining means.

In the cell selection method according to the present invention, preferably, the selecting step is configured so that the selecting means changes a cell reselection condition or priority for selection between cell types, according to the cell type of the serving cell determined by the determining means.

In the cell selection method according to the present invention, more preferably, the selecting step is configured so that the selecting means changes the cell reselection condition, according to the cell type of the neighboring cell determined by the determining means.

In the mobile station according to the present invention, preferably, the cell reselection condition includes at least one of the following reselection conditions: a reselection condition that the target cell is determined to be a neighboring cell with the highest received level out of neighboring cells satisfying a predetermined received level when the received level of the serving cell becomes below a predetermined first threshold; a reselection condition that the target cell is determined to be a neighboring cell a difference of the received level of which from that of the serving cell exceeds a predetermined hysteresis and which has a highest received level; a reselection condition that the target cell is determined to be a neighboring cell which keeps the received level high for a predetermined time, regardless of the received level of the serving cell; and a reselection condition that, when a variation per unit time of the received level of the serving cell exceeds a predetermined second threshold, the target cell is determined to be a neighboring cell with the highest received level out of neighboring cells the received level of each of which exceeds a predetermined third threshold.

In the cell selection method according to the present invention, preferably, the cell reselection condition includes at least one of the following reselection conditions: a reselection condition that the target cell is determined to be a neighboring cell with the highest received level out of neighboring cells satisfying a predetermined received level when the received level of the serving cell becomes below a predetermined first threshold; a reselection condition that the target cell is determined to be a neighboring cell a difference of the received level of which from that of the serving cell exceeds a predetermined hysteresis and which has a highest received level; a reselection condition that the target cell is determined to be a neighboring cell which keeps the received level high for a predetermined time, regardless of the received level of the serving cell; and a reselection condition that, when a variation per unit time of the received level of the serving cell exceeds a predetermined second threshold, the target cell is determined to be a neighboring cell with the highest received level out of neighboring cells the received level of each of which exceeds a predetermined third threshold.

According to these aspects of the invention, the cell reselection condition is changed according to the types of the current and neighboring cells. For example, where the mobile station is camped on an indoor cell, the continuous residence in the serving cell is more likely to stabilize good communication quality, than where the mobile station moves into an outdoor cell. In this case, therefore, when the received level of the serving cell becomes below the predetermined threshold, the mobile station sets the appropriate reselection condition to define as a target cell an outdoor cell with the highest received level out of neighboring cells satisfying the predetermined received level. This can restrict the cell reselection so as to keep the mobile station from reselecting of outdoor cell though the communication quality of the serving cell is not deteriorated.

Furthermore, since a mobile cell moves in a cell range of an outdoor cell, the difference between the received levels of the mobile cell and the outdoor cell is not always constant, even without movement of the mobile station itself. For this reason, it is not preferable to utilize the received level difference between the serving cell (either an outdoor cell or an indoor cell) and a neighboring cell (mobile cell), as a reselection condition for a reselection of the mobile station into the mobile cell. In this case, it is preferable to employ the received level of the neighboring cell (mobile cell) as a reselection condition. Therefore, when the received level of the mobile cell is kept high over the fixed time, the mobile station determines that it is desirable to move into the mobile cell, and thus settles the mobile cell as a target cell. Alternatively, when the variation per unit time of the received level of the serving cell is not less than the predetermined value and when the received level of the mobile cell being a neighboring cell is not less than the predetermined value, the mobile station determines that it is desirable to move into the mobile cell, and thus settles the mobile cell as a target cell.

In the mobile station according to the present invention, as described previously, the cell types are, for example, information indicating that each cell is an indoor cell, an outdoor cell, or a mobile cell.

In the cell selection method according to the present invention, the cell types are, for example, information indicating that each cell is an indoor cell, an outdoor cell, or a mobile cell.

A mobile communication system according to the present invention comprises the above-stated mobile station, and a base station for notifying the mobile station of information enabling identification of a cell type of its own cell or identification of cell types of its own cell and each neighboring cell thereto. According to the present invention, the mobile station is able to determine the cell types of the respective cells (for example, whether each cell is an indoor cell, an outdoor cell, or a mobile cell) as to the current and neighboring cells, based on the above information notified of by the base station. The mobile station makes reference to the determination result and the received levels and changes the cell reselection condition in accordance with the determination result, whereby it can select the cell optimal for communication.

The mobile communication system according to the present invention, preferably, comprises the base station for notifying the mobile station of information about a physical layer of a cell.

The information about the physical layer of the cell is information to distinguish a channel in which a received level is measured, or information for distinguishing a radio communication system and a channel in which a received level is measured.

According to the present invention, the mobile station is also able to reselect a neighboring cell using a radio communication system different from that in the serving cell. For example, even in the case where the outdoor and indoor cells use the radio communication system of CDMA (Code Division Multiple Access) and where the mobile cells use the radio communication system of OFDM (Orthogonal Frequency Division Multiplexing) for communication with the mobile station in the mobile cells, it becomes feasible for the mobile station to implement an appropriate cell reselection from the serving cell to a neighboring mobile cell as long as the mobile station is able to utilize the both communication systems of CDMA and OFDM.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 14 is a diagram for explaining the cell reselection conditions and the priorities for selection among cell types in the second embodiment.

DESCRIPTION OF THE PREFERRED EMBODIMENTS

First Embodiment

The first embodiment of the present invention will be described below in detail with reference to the drawings.

Figure 1:
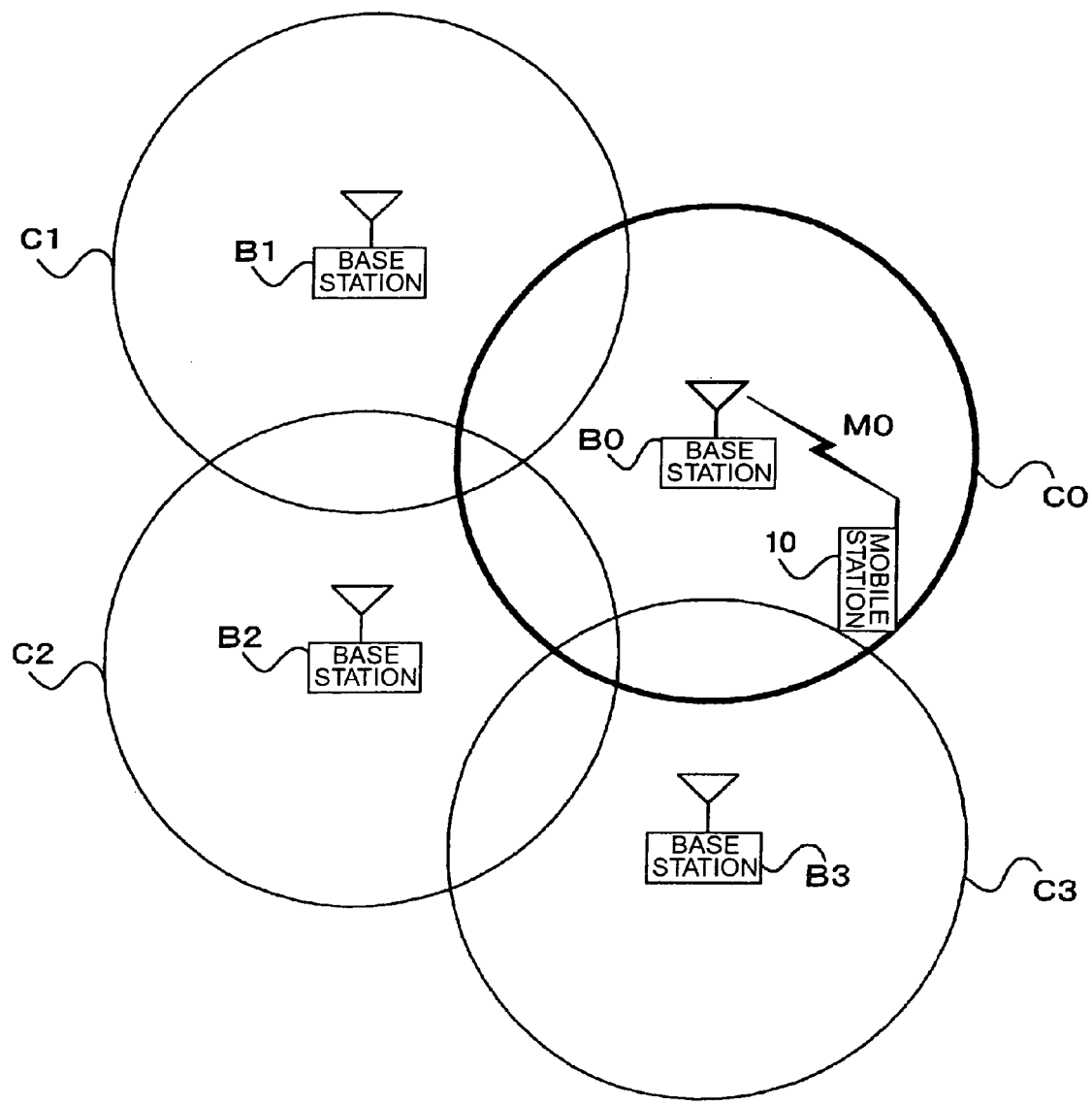
FIG. 1 is a configuration diagram for explaining the conventional cell selection method.
Figure 2:
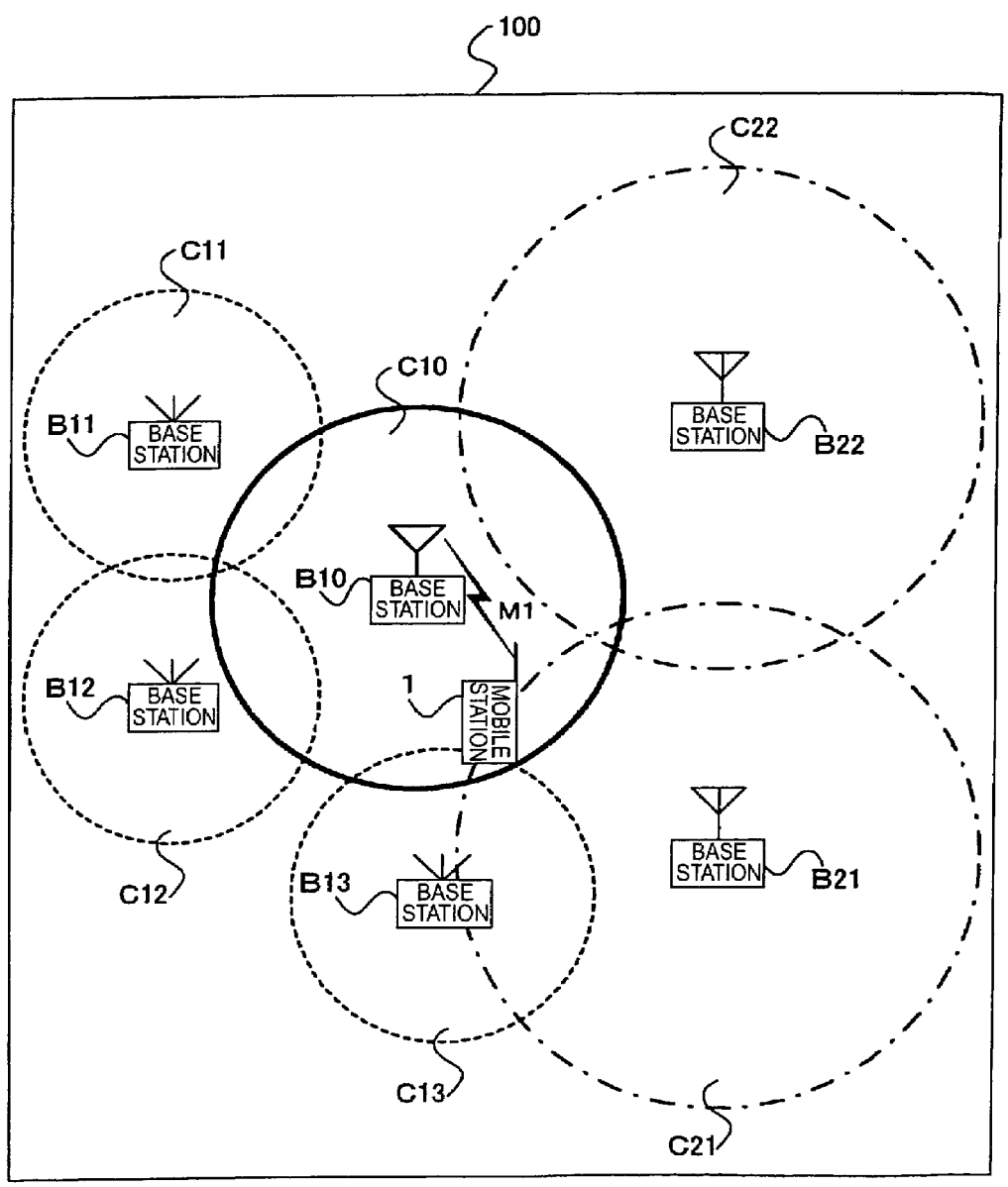
FIG. 2 is an illustration schematically showing the overall configuration of the mobile communication system in the first embodiment.

FIG. 2 is a conceptual diagram showing a configuration of a mobile communication system in the present embodiment. As shown in FIG. 2, mobile communication system 100 is comprised of mobile station 1, base station B10, base stations B11-B13, and base stations B21-B22. Mobile station 1 is camped on cell C10 established by base station B10. Cells C11, C12, and C13 established by the respective base stations B11, B12, and B13 exist as indoor cells neighbor to cell C10, and cells C21 and C22 established by the respective base stations B21 and B22 exist as outdoor cells neighbor to cell C10. In FIG. 2, the indoor cells are indicated by dashed lines and the outdoor cells by chain lines.

Base station B10 notifies mobile station 1 of information indicating that cells C11-C13 and cells C21, C22 exist as neighboring cells and, in addition thereto, information (identification information) enabling identification of each cell, either an indoor cell or an outdoor cell (corresponding to a cell type). Namely, base station B10 notifies the mobile station 1 of broadcast information M1 containing the identification information indicating the cell type of its own cell C10, the identification information indicating that the neighboring cells C11-C13 are indoor cells, and the identification information indicating that the neighboring cells C21, C22 are outdoor cells.

The system may also be configured as follows: base station B10 notifies mobile station 1 of the information that cells C11-C13 and cells C21, C22 are present as neighboring cells, and the identification information indicating that its own cell C10 is either an indoor cell or an outdoor cell, and the base stations forming the respective cells notify the mobile station 1 of the identification information indicating the cell types of the respective neighboring cells C11-C13, C21, and C22.

Figure 3:
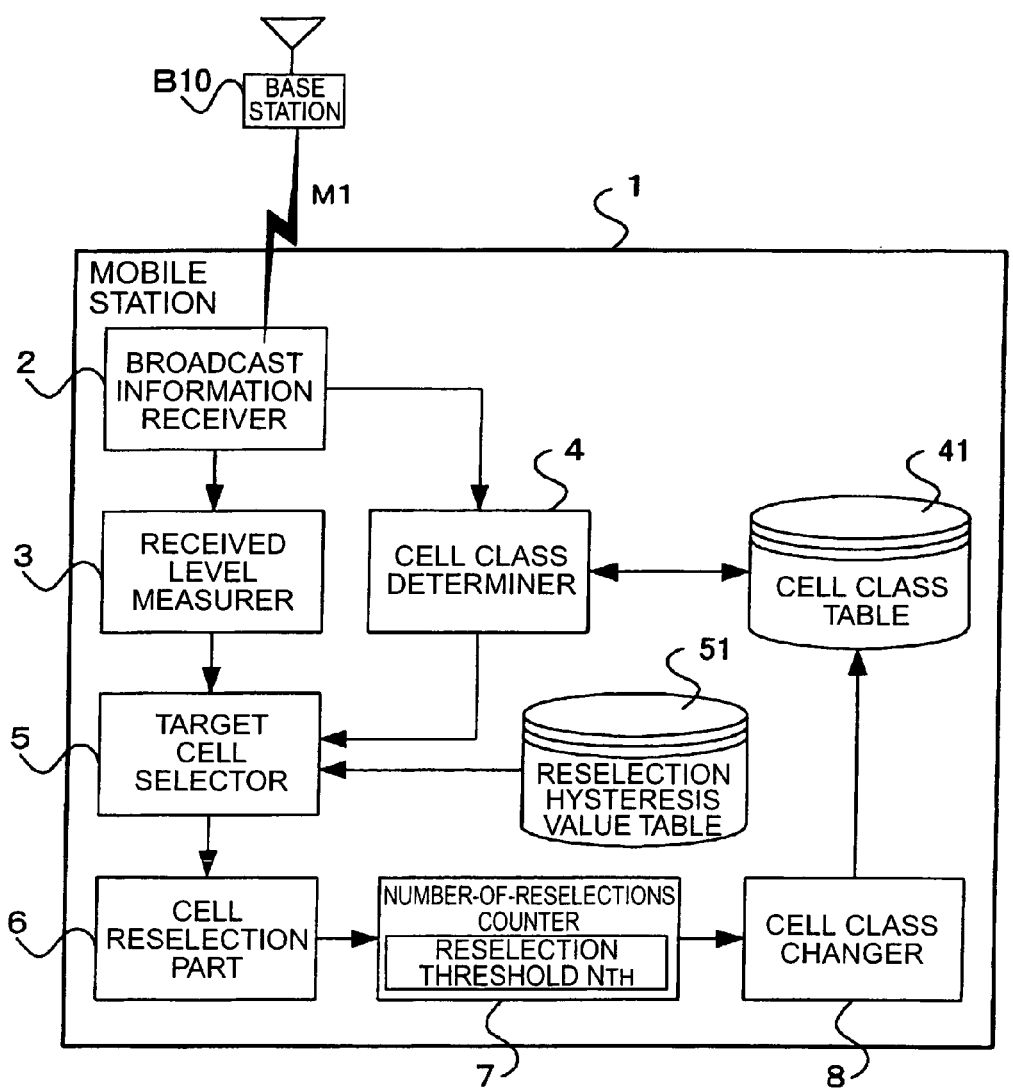
FIG. 3 is a block diagram showing the functional configuration of the mobile station in the first embodiment.

The mobile station as a principal component of the mobile communication system according to the present invention will be detailed below. FIG. 3 is a block diagram showing a functional configuration of mobile station 1. As shown in FIG. 3, mobile station 1 is provided with at least broadcast information receiving part 2, received level measuring part 3 (corresponding to the measuring means), cell class determining part 4 (corresponding to the determining means), target cell selecting part 5 (corresponding to the selecting means), cell reselection part 6, number-of-reselections counting part 7 (corresponding to the counting means), and cell class changing part 8 (corresponding to the changing means).

Broadcast information receiving part 2 receives the broadcast information M1 via a radio channel from base station B10 establishing the serving cell C10 of mobile station 1. The broadcast information M1 contains the identification information indicating the cell type of cell C10, of course, and also contains the identification information indicating the cell types of cells C11-C13, C21-C22 neighbor to cell C-10.

Received level measuring part 3 measures the received levels of the respective cells C10, C11-C13, C21-C22, based on the broadcast information M1 received by broadcast information receiving part 2. This results in measuring the received levels of all the cells to which mobile station 1 can reselect.

Cell class determining part 4 determines the cell class of serving cell C10 with reference to after-described cell class table 41 (corresponding to the storing means). The cell class is information as an index for mobile station 1 to determine a cell in which it is preferentially camped, and a condition for a cell reselection of mobile station 1 becomes tight where the cell class is a priority cell class than where the cell class is a nonpriority cell class.

Figure 4A:
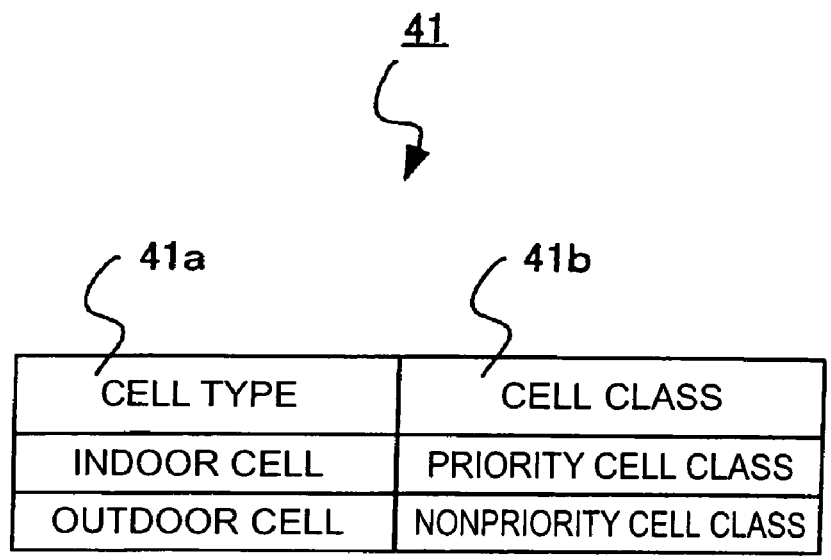
FIG. 4A is a diagram showing a data storage example inside the cell class table before the changing of the cell classes.

FIG. 4A is an illustration showing a configuration example of cell class table 41. As shown in FIG. 4A, cell class table 41 has cell type region 41a and cell class region 41b. Cell type region 41a stores as "cell type, " information indicating that the serving cell of mobile station 1 is either an indoor cell or an outdoor cell. Cell class region 41b stores as "cell class," information indicating that a cell of each corresponding cell type is either the priority cell class or the nonpriority cell class. Since the cell classes are correlated in one-to-one correspondence with the cell types in this way, the determination on the cell class at mobile station 1 equals indirect determination on the cell type.

The initial setting of the cell classes at a start of mobile station 1 is such that the indoor cells are classified under the priority cell class and the outdoor cells under the nonpriority cell class, but the information can be updated according to necessity. The details will be described later, but it is also possible to adopt such a configuration that when the number of reselections between cells of different cell classes exceeds a predetermined threshold (e.g., 5 or so), mobile station 1 changes the cell classes in the cell class region 41b, for example.

Target cell selecting part 5 selects a target cell of mobile station 1, based on the received levels of the respective cells measured by received level measuring part 3 and the cell classes of the respective cells determined by cell class determining part 4. The selection of the target cell herein includes the determination on the propriety of the cell reselection itself, and even in the case where the target cell is selected, the reselection of that cell does not always have to be executed.

Figure 5:
FIG. 5 is a diagram showing a data storage example inside the reselection hysteresis value table.

Target cell selecting part 5 performs the selection of the target cell with reference to reselection hysteresis value table 51. FIG. 5 is an illustration showing a configuration example of reselection hysteresis value table 51. As shown in FIG. 5, reselection hysteresis value table 51 stores $\Delta L(1)$, $\Delta L(2)$, and $\Delta L(3)$ as first to third reselection hysteresis values. The above reselection hysteresis values of three steps are numerals satisfying the relation of $\Delta L(1) < \Delta L(2) < \Delta L(3)$.

$\Delta L(1)$ is used for comparison of received levels between the serving cell belonging to the nonpriority cell class and a neighboring cell belonging to the priority cell class. $\Delta L(1)$ is, for example, approximately −3 dB.

$\Delta L(2)$ is used for comparison of received levels between the serving cell and a neighboring cell, where the serving cell and neighboring cell both belong to the same cell class. $\Delta L(2)$ is, for example, approximately 6 dB. It is a matter of course that $\Delta L(2)$ may take on different values according to whether the serving cell belongs to the priority cell class or not. In this case, the reselection hysteresis values are set in totally four steps.

$\Delta L(3)$ is used for comparison of received levels between the serving cell belonging to the priority cell class and a neighboring cell belonging to the nonpriority cell class. $\Delta L(3)$ is, for example, approximately 9 dB.

Cell reselection part 6 executes the cell reselection where the target cell is selected by target cell selecting part 5 and where the reselection of that cell is determined. The cell reselection means a change of the base station as a source of the broadcast information received by mobile station 1. Cell reselection part 6 outputs a reselection notification indicating completion of the cell reselection, to number-of-reselections counting part 7. This reselection notification contains information indicating whether or not the cell reselection notified of is between cells belonging to different cell classes.

Number-of-reselections counting part 7 counts the number of reselections between cells belonging to different cell classes, according to the reselection notification from cell reselection part 6. Number-of-reselections counting part 7 retains a cell reselection threshold Nth as a criterion for determination on changing of the cell classes and always monitors the magnitude relation between the number of reselections counted and the cell reselection threshold Nth. When the number of reselections becomes larger than the cell reselection threshold Nth, the number-of-reselections counting part 7 instructs cell class changing part 8 to perform changing of the cell classes.

Figure 4B:
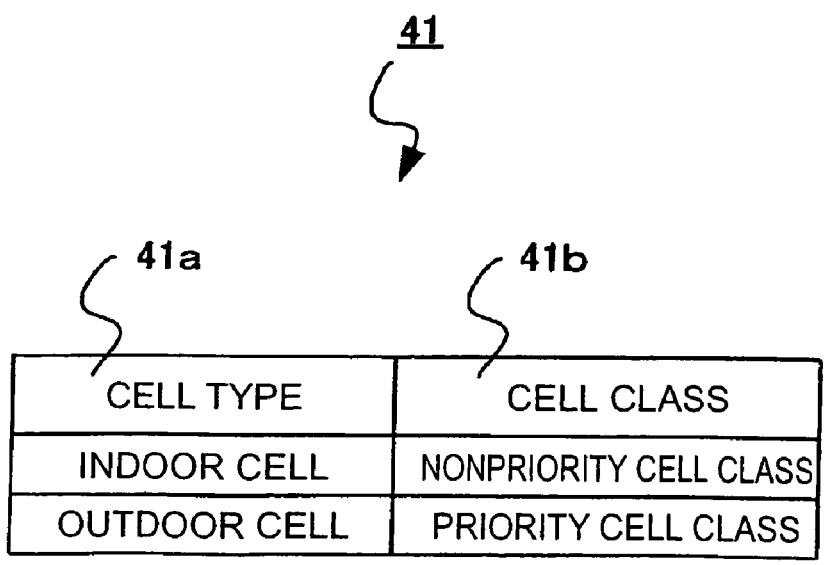
FIG. 4B is a diagram showing a data storage example inside the cell class table after the changing of the cell classes.

When cell class changing part 8 is instructed to change the cell classes by number-of-reselections counting part 7, it accesses cell class table 41 to change the relation between the cell types and the cell classes to another. Namely, cell class changing part 8 sets the nonpriority cell class in the cell class region 41b in which the priority cell class has been set heretofore, and also sets the priority cell class in the cell class region 41b in which the nonpriority cell class has been set heretofore. As a consequence, as shown in FIG. 4B, the cell classes are changed in the cell class table 41.

Figure 6:
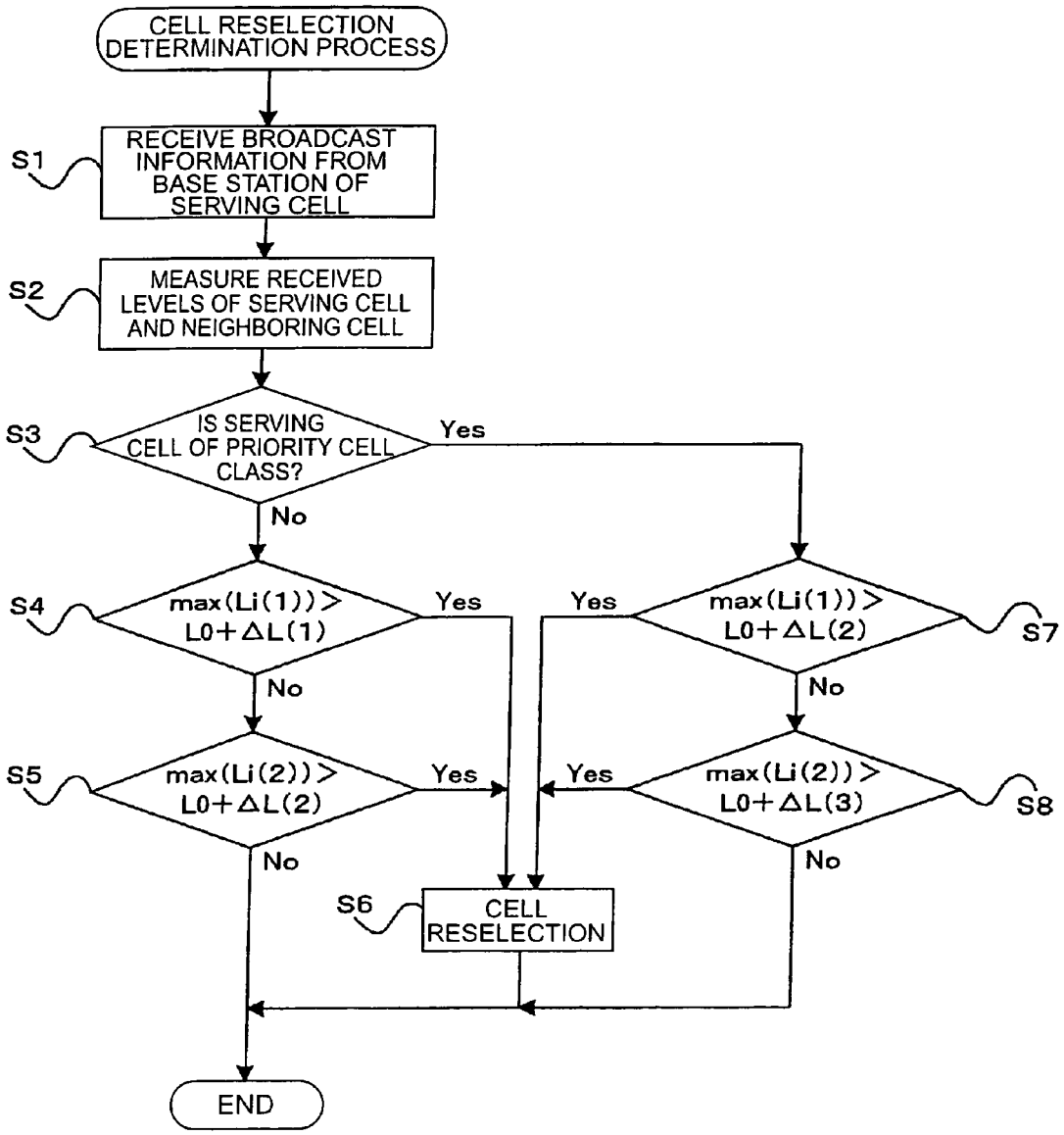
FIG. 6 is a flowchart for explaining the cell reselection determination process.

The operation of the mobile communication system will be described below. In conjunction therewith, each of steps in the cell selection method according to the present invention will also be described. FIG. 6 is a flowchart for explaining the cell reselection determining process executed by mobile station 1.

First, broadcast information receiving part 2 of mobile station 1 receives the broadcast information M1 from base station B10 of the serving cell (S1).

Received level measuring part 3 measures each of the received level L10 from base station B10 and the received levels L11-L13, L21, L22 from base stations B11-B13, B21, B22 of the respective neighboring cells, with reference to the broadcast information M1 received from base station B10 (S2).

Subsequently, cell class determining part 4 determines to which cell class, either the priority cell class or the nonpriority cell class, the serving cell C10 belongs, with reference to cell class table 41 (S3).

When the result of the determination is that the serving cell C10 is an outdoor cell, since it belongs to the nonpriority cell class, target cell selecting part 5 selects a target cell on the basis of the result of the comparison between the received level of the serving cell and the received levels of neighboring cells belonging to the priority cell class. Specifically, target cell selecting part 5 selects the target cell, using conditions (3), (4) below.

$$\max(Li(1))=\max(L11, L12, L13) \quad (3)$$

$$\max(Li(1))>L0+\Delta L(1) \quad (4)$$

Here max(argument 1, argument 2, . . . ) represents a function that gives a maximum argument out of argument 1, argument 2, . . . Moreover, L0 indicates the received level of the serving cell and $\Delta L(1)$ the first reselection hysteresis value as described above. In addition, Li(1) indicates a received level of a neighboring cell belonging to the priority cell class.

When condition (4) becomes true (S4; Yes), target cell selecting part 5 selects a neighboring cell corresponding to max(Li(1)) as a target cell and instructs cell reselection part 6 to implement the reselection of the cell. In the next process, the cell reselection part 6 thus instructed to perform the cell reselection makes mobile station 1 reselect the cell selected at S4 (S6). After completion of the reselection, the sequential reselection determining process ends.

In contrast to it, when condition (4) does not become true (S4; No), the flow moves to the process of S5.

At S5, target cell selecting part 5 compares the received level of the serving cell with the received levels of the neighboring cells belonging to the same nonpriority cell class as the serving cell, and selects the target cell on the basis of the result of the comparison. Namely, target cell selecting part 5 selects the target cell, using conditions (5), (6) below.

$$\max(Li(2))=\max(L21, L22) \quad (5)$$

$$\max(Li(2))>L0+\Delta L(2) \quad (6)$$

Here max(argument 1, argument 2, . . . ) represents a function that gives the maximum argument out of argument 1, argument 2, . . . Moreover, L0 indicates the received level of the serving cell and $\Delta L(2)$ the second reselection hysteresis value as described above. Furthermore, Li(2) indicates a received level of a neighboring cell belonging to the nonpriority cell class.

When the result of the determination is that condition (6) becomes true (S5; Yes), target cell selecting part 5 selects a neighboring cell corresponding to max(Li(2)) as a target cell and instructs cell reselection part 6 to make a reselection of the cell. At S6, cell reselection part 6 instructed to implement the cell reselection makes mobile station 1 reselect the cell selected at S5. After completion of the reselection, the sequential reselection determining process ends.

In contrast to it, when condition (6) does not become true (S5; No), the cell reselection determining process is terminated without execution of the cell reselection.

The following will describe the processing executed when the result of the determination process at S3 is that the serving cell belongs to the priority cell class. Target cell selecting part 5 compares the received level of the serving cell with the received levels of the neighboring cells belonging to the same priority cell class as the serving cell, and selects a target cell on the basis of the result of the comparison.

Namely, target cell selecting part 5 selects the target cell, using conditions (7), (8) below.

$$\max(Li(1))=\max(L11, L12, L13) \quad (7)$$

$$\max(Li(1))>L0+\Delta L(2) \quad (8)$$

When condition (8) becomes true (S7; Yes), target cell selecting part 5 selects a neighboring cell corresponding to max(Li(1)) as a target cell, and instructs cell reselection part 6 to implement a reselection of the cell. Subsequently, cell reselection part 6 instructed to perform the cell reselection makes mobile station 1 reselect the cell selected at S7 (S6). After completion of the reselection, the sequential reselection determining process ends.

In contrast to it, when condition (8) does not become true (S7; No), the flow moves to the process of S8.

At S8, target cell selecting part 5 compares the received level of the serving cell with the received levels of the neighboring cells belonging to the nonpriority cell class, and selects a target cell on the basis of the result of the comparison. Namely, target cell selecting part 5 selects the target cell, using conditions (9), (10) below.

$$\max(Li(2))=\max(L21, L22) \quad (9)$$

$$\max(Li(2))>L0+\Delta L(3) \quad (10)$$

As described previously, $\Delta L(3)$ indicates the third reselection hysteresis value.

When the result of the above determination is that condition (10) becomes true (S8; Yes), target cell selecting part 5 selects a neighboring cell corresponding to max(Li(2)) as a target cell, and instructs cell reselection part 6 to implement a reselection of the cell. Next, cell reselection part 6 instructed to perform the cell reselection makes mobile station 1 reselect the cell selected at S8 (S6). After completion of the reselection, the sequential reselection determining process ends.

In contrast to it, when condition (10) does not become true (S8; No), the cell reselection determining process is terminated without execution of the cell reselection.

In mobile communication system 100, as described above, mobile station 1 executes the cell reselection determining process, thereby adopting the different cell reselection conditions between where the serving cell belongs to the nonpriority cell class and where the serving cell belongs to the priority cell class. Specifically, where the serving cell belongs to the nonpriority cell class, mobile station 1 is camped on an outdoor cell, and thus the lower reselection hysteresis value is used than where the serving cell belongs to the priority cell class. This looses the reselection condition from the outdoor cell and increases the percentage of mobile station 1 leaving the outdoor cell. In other words, where the serving cell belongs to the priority cell class, mobile station 1 is camped on an indoor cell, the higher reselection hysteresis value is used than where the serving cell belongs to the nonpriority cell class. This makes the reselection condition from the indoor cell tight and increases the percentage of mobile station 1 staying in the indoor cell.

Independent of to which cell class the serving cell belongs, mobile station 1 employs the different cell reselection conditions for the neighboring cells belonging to the priority cell class and for the neighboring cells belonging to the nonpriority cell class. Specifically, since a neighboring cell belonging to the priority cell class is an indoor cell, mobile station 1 uses the lower reselection hysteresis value in the selection of the target cell in that case than in the case of a neighboring cell belonging to the nonpriority cell class. This looses the reselection condition to the indoor cell and increases the percentage of mobile station 1 reselecting the indoor cell. In other words, since a neighboring cell belonging to the nonpriority cell class is an outdoor cell, mobile station 1 uses the higher reselection hysteresis value in that case than in the case of a neighboring cell belonging to the priority cell class. This makes the reselection condition to the outdoor cell tight and keeps low the percentage of mobile station 1 reselecting the outdoor cell.

Namely, mobile station 1 adaptively changes the target cell, depending upon the surrounding environment including the serving cell. This results in selecting a neighboring cell with higher communication stability as a target cell, whereby mobile station 1 can perform stable communication with the base station. As a result, mobile station 1 becomes able to perform low-power and high-speed communication.

Figure 7:
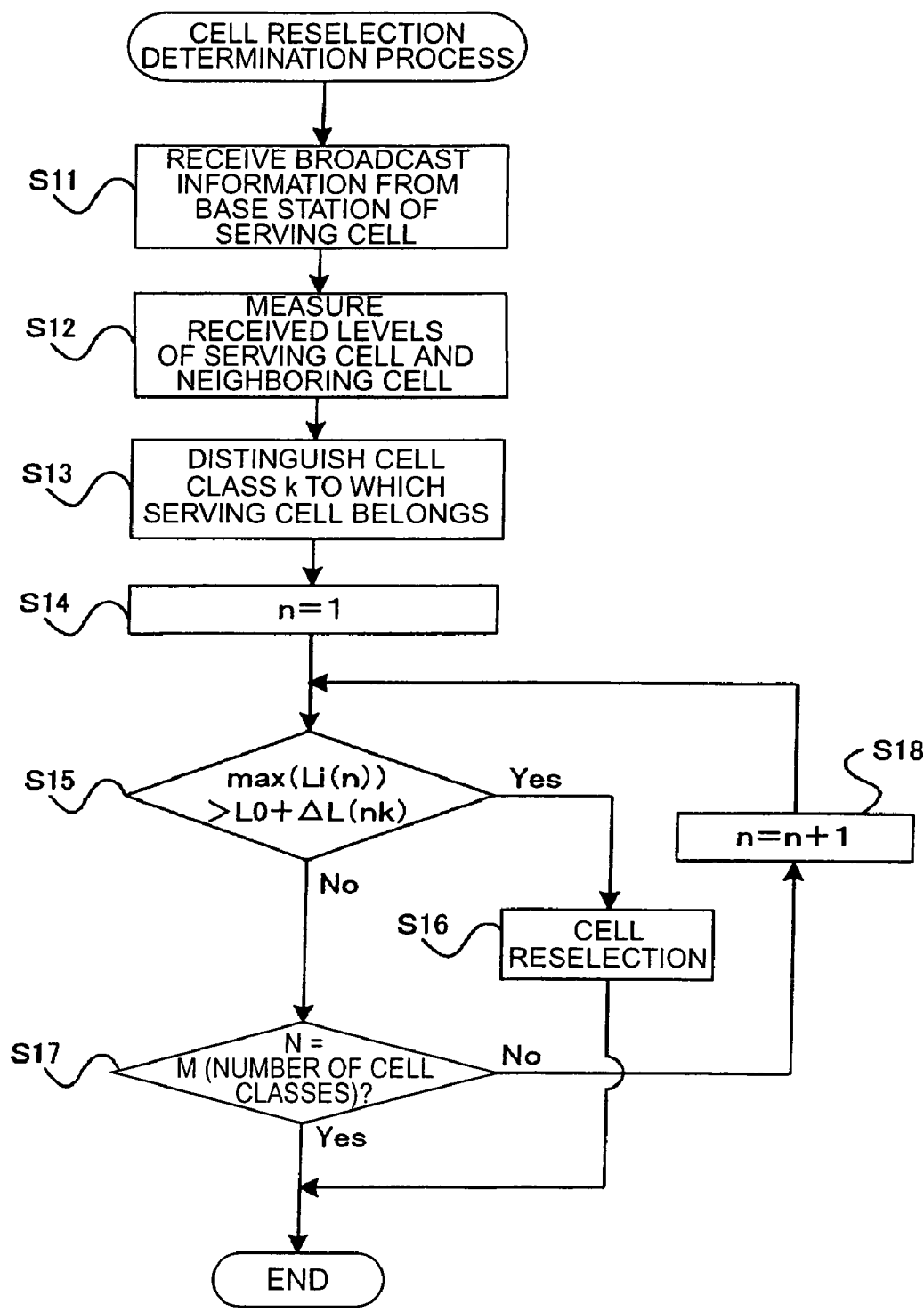
FIG. 7 is a flowchart for explaining a generalized example of the cell reselection determination process.

The above cell reselection determining process was described on the assumption that the cell classes were only two types, the priority and nonpriority, and that the cell types were only two types, the indoor cells and outdoor cells. However, the target cell selection technology according to the present invention is also applicable to cases where the cell classes and cell types each are M species (M is an integer not less than 3); for example, a case where the cell classes are three species, priority 1, priority 2, and priority 3 and where the cell types are three species, nanocells, microcells, and macrocells. FIG. 7 is a flowchart showing the cell reselection determining process as a generalized example including such cases. The present cell reselection determining process includes steps common to the cell reselection determining process which was described with reference to FIG. 6, and thus the corresponding steps will be denoted by the same series of step numbers (with the same last numbers), without redundant description of the same steps. Specifically, S11, S12, and S16 in FIG. 7 are equivalent to S1, S2, and S6, respectively, shown in FIG. 6.

The steps specific to the present example will be described below.

After completion of the processes of S11 and S12, cell class determining part 4 makes reference to the cell class table (not shown) in which M cell types are correlated with M cell classes, and identifies a cell class k (k is an integer from 1 to M) to which the serving cell belongs, based on the cell type included in the broadcast information (S13).

The class k of the serving cell is an integer not less than 1 nor more than the number M of cell classes and cell types. It is assumed herein that value 1 of k indicates the highest priority.

At S14, cell class determining part 4 substitutes "1" as an initial value into counter n (n is a natural number) for identifying a cell class of a neighboring cell.

At S15, target cell selecting part 5 performs a selection of a target cell on the basis of the received level of the serving cell and the received levels of neighboring cells. Specifically, target cell selecting part 5 selects the target cell, using conditions (11), (12) below.

$$\max(Li(n)) = \max(Ln1, Ln2, \ldots, Lnm) \quad (11)$$

$$\max(Li(n)) > L0 + \Delta L(nk) \quad (12)$$

Here Ln1-Lnm are cells neighbor to the serving cell C10, and indicate the received levels of the cells Cn1-Cnm the cell type of which belongs to the cell class n. The received levels used herein are the values measured at S12. Furthermore, $\max(Li(n))$ is a function that gives the maximum received level value out of Ln1-Lnm. L0 indicates the received level of the serving cell C10, and $\Delta L(nk)$ indicates a reselection hysteresis value used in the level comparison between the received level L0 of the serving cell and the received levels Ln1-Lnm of the neighboring cells belonging to the cell class n, where the serving cell belongs to the cell class k. For example, when the number of cell classes is M, there exist the square of M of reselection hysteresis values like $\Delta L(11)$, $\Delta L(12), \ldots, \Delta L(1M), \Delta L(21), \ldots, \Delta L(2M), \ldots, \Delta L(MM)$.

For example, in the case of M=3, $\Delta L(MM) = -3, 3, 6; 3, 6, 9; 6, 9, 12$.

There are the nine reselection hysteresis values, and the reselection hysteresis values are set in totally (2M−1) steps. It is a matter of course that the reselection hysteresis values can be set in an arbitrary number of steps according to the configuration of cells or the like.

If cell class 1 is a cell class with the highest priority and if the following relations exist among the reselection hysteresis values:

$$\Delta(1k) < \Delta(2k) < \ldots < \Delta(Mk) \quad (13)$$

$$\Delta(n1) < \Delta(n2) < \ldots < \Delta(nM) \quad (14),$$

the reselection condition is loosed more to the cell belonging to the cell class with the higher priority, and the reselection condition is made tight to the cell belonging to the cell class with the lower priority.

For example, in the case of k=2 and n=1, the conditions equivalent to aforementioned conditions (3), (4) are used and the process equivalent to S4 in FIG. 6 is executed.

At S15, when condition (12) becomes true (S15; Yes), target cell selecting part 5 selects a neighboring cell corresponding to $\max(Li(n))$ as a target cell, and instructs cell reselection part 6 to implement a reselection of the cell. In the next process, cell reselection part 6 instructed to perform the cell reselection makes mobile station 1 reselect the neighboring cell selected at S15 (S16). After completion of the reselection, the sequential reselection determining process is terminated.

In contrast to it, when condition (12) does not become true (S15; No), the flow proceeds to the process of S17 described below.

At S17, cell class determining part 4 determines whether n=M, i.e., whether the counter n for distinguishing the cell class of the neighboring cells used in the reselection determination reaches the number M of cell classes. When the result of the determination is that n reaches M (S17; Yes), mobile station 1 terminates the sequential reselection determination process without execution of the cell reselection from the serving cell C10.

On the other hand, when the result of the determination at S17 is that n is still below M, i.e., n<M (S17; No), the flow shifts to S18. At S18, cell class determining part 4 adds 1 to the current counter n, to set n=n+1. After completion of this process, the flow returns to S15 and the processes at and after S15 are again executed.

Namely, since the previous process of S15 resulted in selecting no target cell from the neighboring cells Cn1-Cnm belonging to the cell class n, S15 at this time is carried out again to attempt to select a target cell out of neighboring cells C(n+1)1-C(n+1)m belonging to the cell class (n+1) with the priority lower than that of the cell class n.

As the sequential processes of S15-S18 are repeatedly executed, the reselection hysteresis value $\Delta L(nk)$ used for the selection of the target cell by mobile station 1 is successively updated in the named order of $\Delta L(1k), \Delta L(2k), \ldots, \Delta L(Mk)$ until the counter n for distinguishing the cell class of the neighboring cell reaches the number M of cell classes and cell types. Even if the counter n is equal, the reselection hysteresis value $\Delta L(nk)$ is set at values different depending upon the cell class k to which the serving cell C10 belongs. Therefore, mobile station 1 can properly change the cell reselection condition according to the cell class k of the serving cell C10. As described previously, the cell classes k are set based on the cell types. Accordingly, in the case where the cell classes are classified in three or more species as in the present example, it also becomes feasible to change the cell reselection condition according to the cell type of the serving cell C10.

In the cell reselection determination process described with reference to FIG. 6, mobile station 1 was configured to implement the cell reselection with the higher priority on the indoor cells belonging to the priority cell class than on the outdoor cells belonging to the nonpriority cell class, and the cell reselection determination process of this type involves the concern that frequent cell reselections occur between cells belonging to different cell classes (for example, between indoor cells and outdoor cells). Such concern becomes prominent, particularly, in the case where mobile station 1 moves at high speed in the vicinity of the marginal territory of the serving cell, for example. Let us consider a situation in which the frequency of cell reselections becomes excessively high in the case where the indoor cells are classified under the priority cell class and the outdoor cells under the nonpriority cell class, and a solution thereto will be described below.

Figure 8:
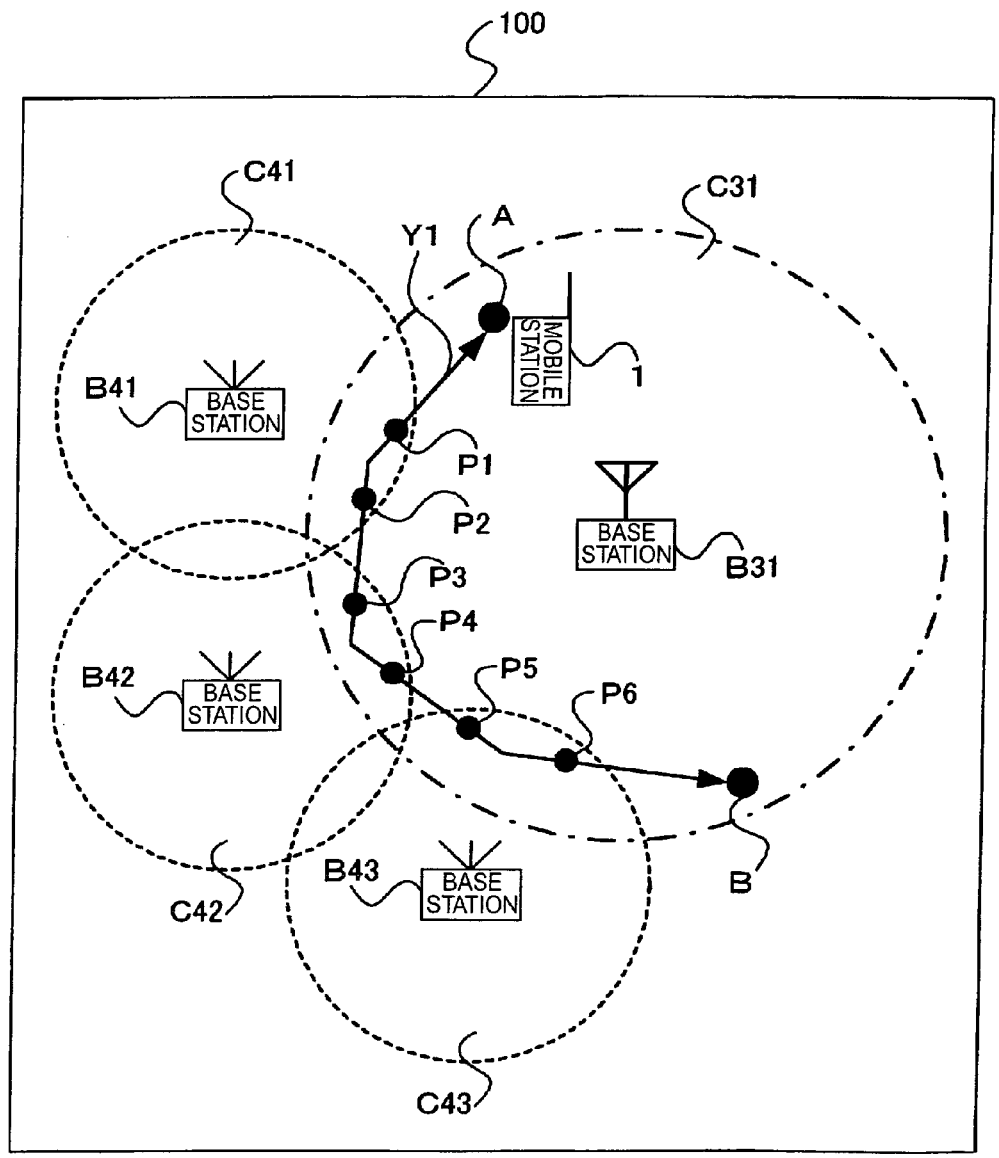
FIG. 8 is an illustration for explaining the cell arrangement and movement path with high frequency of cell reselections by the mobile station.

FIG. 8 is an illustration schematically showing a configuration of a mobile communication system wherein mobile station 1 is camped on a cell different from that in the above example. As shown in FIG. 8, base station B31 establishes an outdoor cell C31, and base stations B41, B42, B43 their respective indoor cells C41, C42, C43. In FIG. 8, the indoor cells are represented by dashed lines, and the outdoor cell by a chain line. In the present embodiment, mobile station 1 is camped on at least the outdoor cell C31, and near the marginal territory of the outdoor cell C31, it moves back and forth between location A and location B through a path indicated by solid arrows Y1.

Figure 9:
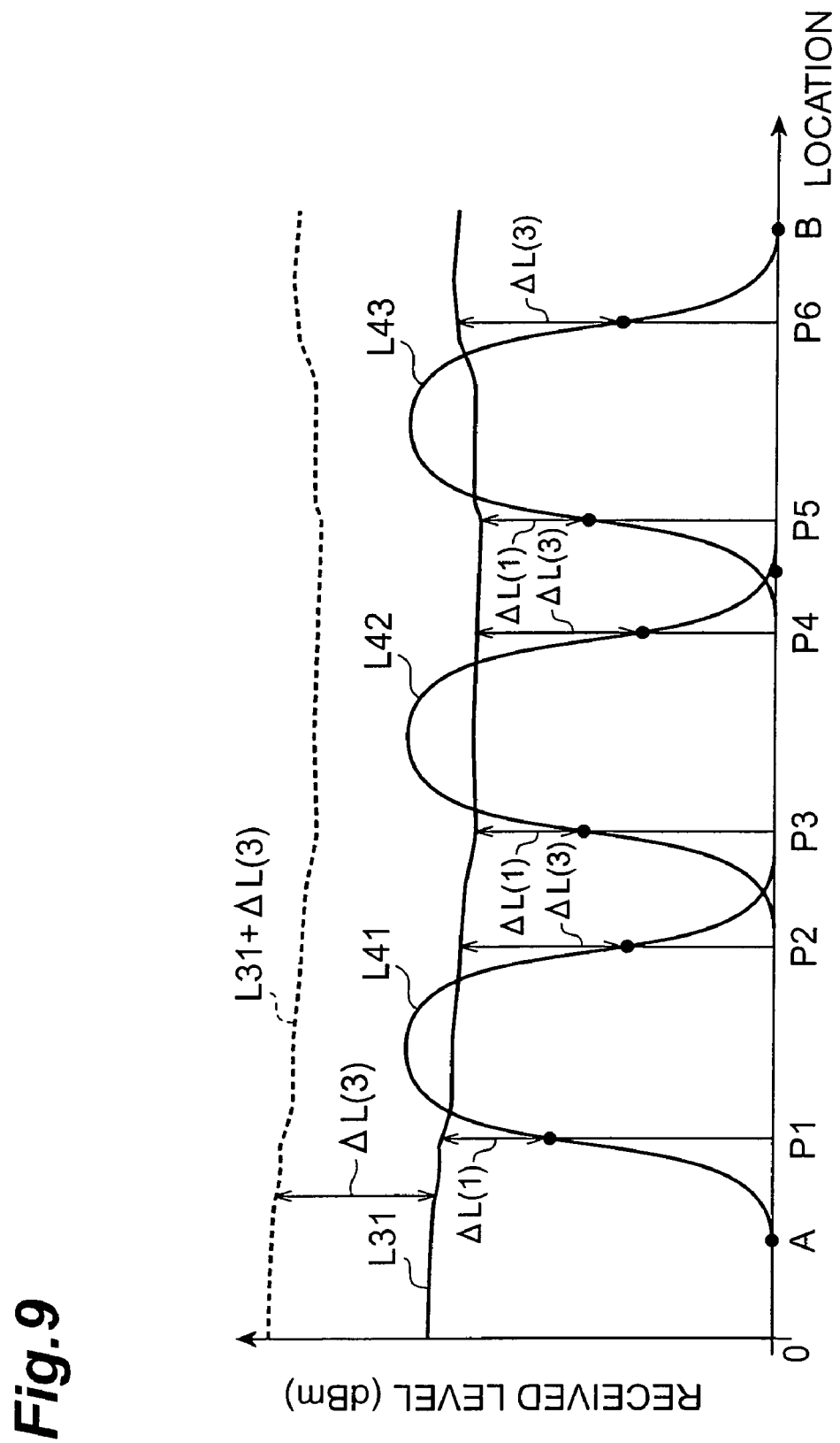
FIG. 9 is a diagram showing the magnitude relation among the received levels of the respective cells, which varies with time according to locations of the mobile station.

FIG. 9 shows a state in which the received levels from the respective base stations vary according to locations of mobile station 1 under the above situation. In FIG. 9, the locations of mobile station 1 are defined on the horizontal axis, and the received levels from the base stations B31, B41-B43 according to the locations of mobile station 1 on the vertical axis. The solid lines indicated by L31, L41-L43 show respective states in which the received levels from the base stations B31, B41-B43 vary with displacement of mobile station 1. Mobile station 1 always stays in the outdoor cell C31, while entering and leaving each of the indoor cells C41-C43. Therefore, the range of variation of the received level L31 is small, and those of L41-L43 are large.

Therefore, if mobile station 1 executes the foregoing cell reselection determination process under the condition that the indoor cells belong to the priority cell class and the outdoor cell to the nonpriority cell class, cell reselections will be carried out at a total of six positions, P1-P6 as shown in FIGS. 8 and 9. Such highly frequent reselections can induce degradation of quality of links and increase in the control load on the system and possibly impede stable communication between the mobile station and the base station. It is thus desirable to restrain the frequency of cell reselections by some means according to necessity.

With reference to FIG. 9, it is anticipated that cell reselections will occur because of the frequent change in the magnitude relation between the received level L31 and the received levels L41-L43. For this reason, an effective means for suppressing the frequent cell reselections is to increase the threshold of the received level L31 as a criterion to determine the propriety of cell reselections. By defining the received level of $L31+\Delta L(3)$ as a threshold as indicated by the dashed line, the threshold always becomes greater than the received levels L41-L43, regardless of the rapid variation of the received levels L41-L43. In this case, no cell reselection occurs during the process in which mobile station 1 moves between the locations A, B.

In order to increase the received level as the above threshold, a conceivable method is, for example, a technique of changing the cell classes. Namely, the indoor cells are classified under the nonpriority cell class and the outdoor cells under the priority cell class, as in the cell class table 41 shown in FIG. 4B. This results in changing the reselection hysteresis value, which is used in the determination on the reselection from cell C31 into one of cells C41-C43, from $\Delta L(1)$ to $\Delta L(3)$. Since $\Delta L(3) > \Delta L(1)$ as described previously, $L31+\Delta L(3)$ becomes larger than $L31+\Delta L(1)$, so as to decrease the frequency of cell reselections.

Figure 10:
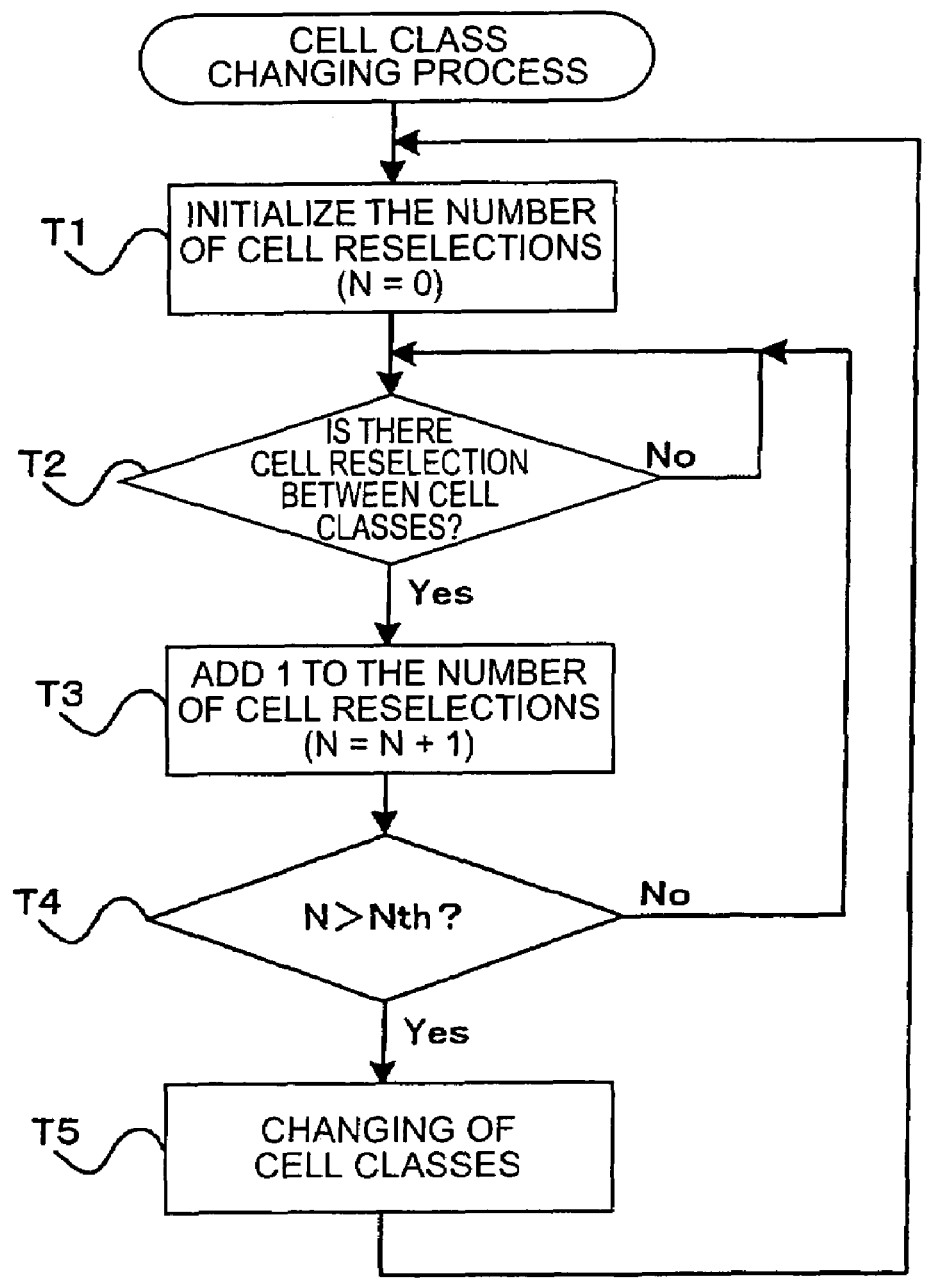
FIG. 10 is a flowchart for explaining the cell class changing process.

The cell class changing process executed by mobile station 1 will be described below as an example of the processing for restraining the highly frequent cell reselections, with reference to FIG. 10.

The operation will be described on the premise that the cell class changing process is a process independent of the aforementioned cell reselection determination process and can also be executed in parallel with the cell reselection determination process, of course. The cell class changing process is initiated at the timing of a start of mobile station 1.

First, number-of-reselections counting part 7 substitutes "0" as an initial value into the number N of cell reselections of initialize and retain the number of cell reselections (T1).

Number-of-reselections counting part 7 always monitors input of a reselection notification. When detecting input of a reselection notification from cell reselection part 6, it determines whether mobile station 1 has reselected between cells belonging to different cell classes, based on the reselection notification (T2).

When the result of the determination is that the cell reselection was carried out (T2; Yes), number-of-reselections counting part 7 adds an increment of "1" to the number of cell reselections, to set N=N+1 (T3).

At T4, number-of-reselections counting part 7 compares the number N of cell reselections at the present time with the reselection threshold Nth to determine the magnitude relation. When the result of the comparison satisfies the relation of N>Nth (T4; Yes), the flow shifts to T5 and cell class changing part 8 changes the cell classes presently stored in cell class region 41*b*. Specifically, the nonpriority cell class is set as a cell class corresponding to the cell type of indoor cells, and the priority cell class as a cell class corresponding to the cell type of outdoor cells.

On the other hand, when the result of the comparison at T4 does not satisfy the relation of N>Nth (T4; No), it is determined that the frequency of cell reselections is still not too high to require the changing of cell classes, and the flow returns to T2. Then number-of-reselections counting part 7 repeatedly executes the processes of T2-T4 before N exceeds Nth.

When the number N of cell reselections exceeds the reselection threshold Nth and when the changing of the cell classes at T5 is completed, the flow moves to T1 to again initialize the number N of cell reselections and then repeatedly execute the processes at and after T1.

The changing operation of the cell classes to which the respective cells C31, C41-C43 belong, results in making the serving cell C31 of mobile station 1 belong to the priority cell class and making the neighboring cells C41-C43 to mobile station 1 belong to the nonpriority cell class. Therefore, the cell reselection determination process is executed using $\Delta L(3)$ as a reselection hysteresis value in the comparison of the received levels at mobile station 1 in FIG. 8 (cf. S8 in FIG. 6). If the change of the cell classes is not carried out, $\Delta L(1)$ will be continuously used. Since $\Delta L(3) > \Delta L(1)$, the change of the cell classes makes the cell reselection condition tight, and decreases the frequency of cell reselections due to the temporal variation of the received levels of the neighboring cells C41-C43.

In the mobile communication system 100, as described above, mobile station 1 is preferably configured to count the number of changes in the cell class of the serving cell due to cell reselections on a historical basis and change the relation between the cell types and the cell classes when it determines that reselections between cells of different cell classes are too frequent. By autonomously changing the classifications of the cell classes according to the activity and the surrounding environment of the mobile station 1 in this way, it becomes feasible to increase the received level threshold as a criterion to determine the propriety of cell reselections. This restrains the frequency of cell reselections. As a consequence, it becomes feasible to decrease or suppress the discontinuation of data transmission due to the cell reselections and thus increase the throughput of the system, while decreasing the control load due to the cell reselections.

It is noted that the modes described in the present embodiment are just the preferred examples of the mobile communication system according to the present invention and that the present invention is by no means intended to be limited to the above modes.

For example, a potential configuration is such that a timer T01 (not shown) is started at the same time as the initialization of the number of cell reselections (cf. T1 in FIG. 10) and when the elapsed time indicated by the timer T01 reaches a predetermined time (e.g., about ten minutes), the reselection counter N is initialized, regardless of the value of the reselection counter N at that point. This process can limit the condition for the change of the cell classes to cases where the number of cell reselections between cells belonging to different cell classes exceeds the threshold Nth within the above predetermined time. Accordingly, it becomes feasible to execute the cell reselection determination based on the frequency of cell reselections calculated more precisely. Such condition setting is effective particularly in application to cases where mobile station 1 moves back and forth in the same path at high speed.

A further potential configuration is such that a timer T02 (not shown) is started at a point where the relation between the cell types and the cell classes is changed from the initial setting (cf. T5 in FIG. 10) and if the relation different from the initial setting is continued until the elapsed time of the timer T02 reaches a predetermined time (e.g., about five minutes), the relation is forcedly brought back to the initial setting. This configuration permits the relation of the initial setting to be used again for the determination on cell reselections in the case where the cell classes are once changed and thereafter the frequency of cell reselections becomes lower than before. As a consequence, it is feasible to prevent the relation different from the initial setting from being continuously used even during periods in which the degree of necessity for use of the relation different from the initial setting is low.

Second Embodiment

Subsequently, the second embodiment of the present invention will be described with reference to FIGS. 11 to 14. Since the mobile communication system in the second embodiment includes the components and processes common to those in the mobile communication system in the first embodiment, only differences from the first embodiment described above will be detailed below.

Specifically, the cell selection technology in the first embodiment involved no consideration to existence of mobile cells as one of the cell forms. A mobile cell is constructed by a moving object such as a train, a bus, or the like, and is a cell having a mechanism capable of maintaining communication between a mobile station in the cell and the mobile communication system while keeping the configuration even with movement in the mobile communication system. A mobile base station communicates through a radio link with external base stations (outdoor cells and indoor cells) and a mobile station in the mobile cell is connected through a relay node installed on the mobile cell, to the mobile communication system.

This configuration of making the mobile station connected through the use of the mobile cell to an external base station without being directly connected thereto, has the advantage of achieving low power consumption and stabilize communication quality. It is thus contemplated that where the serving cell or the neighboring cell is a mobile cell, it is necessary to adopt another cell selection method different from that for the indoor and outdoor cells in the first embodiment, from the characteristics of the mobile cells described above. The mobile communication system in the second embodiment implements it.

The detailed system configuration will be described later, but the principal features of the present embodiment are to change the cell reselection condition according to the types of the serving cell of the mobile station and a neighboring cell thereto and to change selection priorities among the cell types according to the cell type of the serving cell. Namely, the present mobile communication system variably determines the cell reselection condition, depending upon whether the serving cell is either an indoor cell, an outdoor cell, or a mobile cell. The cell reselection condition is also variably determined depending upon whether the neighboring cell is either an indoor cell, an outdoor cell, or a mobile cell. Furthermore, the present system determines for which cell type a process for a determination on a reselection of a neighboring cell should be preferentially executed, according to the type of the serving cell of the mobile station.

Figure 11:
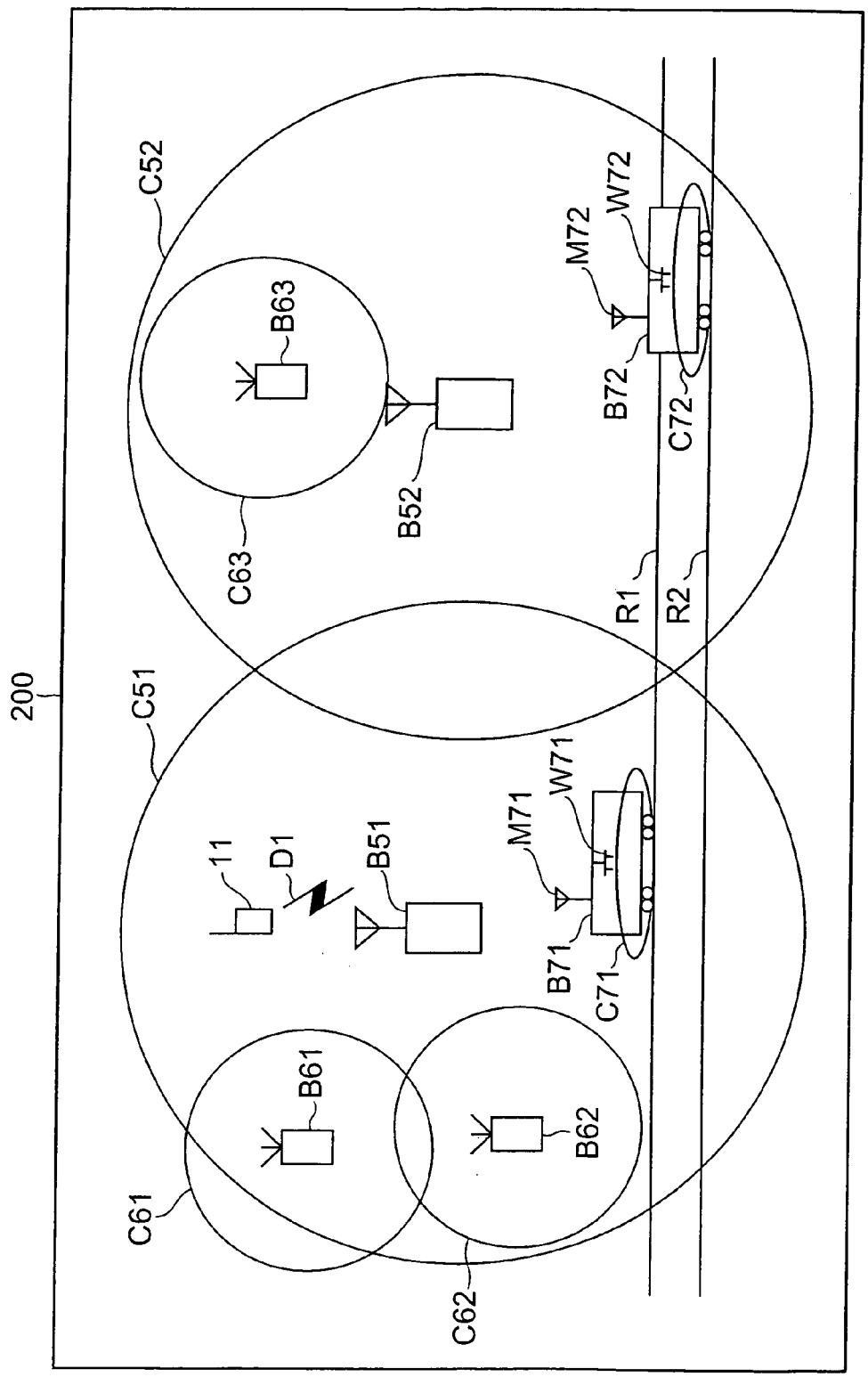
FIG. 11 is an illustration schematically showing the overall configuration of the mobile communication system in the second embodiment.

FIG. 11 is a conceptual diagram showing a configuration of the mobile communication system in the second embodiment. As shown in FIG. 11, mobile communication system 200 is comprised of mobile station 11, base stations B51, B52, base stations B61-B63, and mobile base stations B71-B72. The outdoor cells are those C51, C52 established by the respective outdoor base stations B51, B52, and the indoor cells are those C61-C63 established by the respective indoor base stations B61-B63.

The mobile base stations B71, B72 are provided with their respective radio devices M71, M72 for connection to the external base stations B51, B52, B61-B63. The mobile base stations B71, B72 are also provided with their respective radio devices W71, W72 for establishing the mobile cells C71, C72. In FIG. 11, the mobile station 11 and mobile base station B71 are camped on the outdoor cell C51 established by base station B51.

It is assumed in the present embodiment that the mobile base stations B71, B72 are trains and that routes R1, R2 are railroads. Mobile base station B71 moves on the route R1 and mobile base station B72 on the route R2. Base station B51 notifies mobile station 11 of information (identification information) enabling identification of each cell, either an indoor cell, an outdoor cell, or a mobile cell (corresponding to a cell type), in addition to information indicating that the outdoor cell C52, indoor cells C61, C62, and mobile cell C71 exist as neighboring cells.

Namely, base station B51 notifies mobile station 11 of broadcast information D1 containing the identification information indicating the cell type of its own cell C51, the identification information indicating that the neighboring cell C52 is an outdoor cell, the identification information indicating that the neighboring cells C61, C62 are indoor cells, and the identification information indicating that the neighboring cell C71 is a mobile cell.

The neighboring cells herein include both cells overlapping in part with a cell in question and cells overlapping completely with a cell in question. Namely, in FIG. 11, the neighboring cells to outdoor cell C51 encompass cells C62, C71 as well as cells C52, C61. The neighboring cells to indoor cell C62 encompass cell C51 as well as cell C61.

The system may be modified so that base station B51 notifies mobile station 11 of the identification information indicating whether its own cell C51 is either an indoor cell, an outdoor cell, or a mobile cell and the base stations forming the respective cells notify the mobile station of the identification information indicating the cell types of the respective neighboring cells C52, C61, C62, C71.

Figure 12:
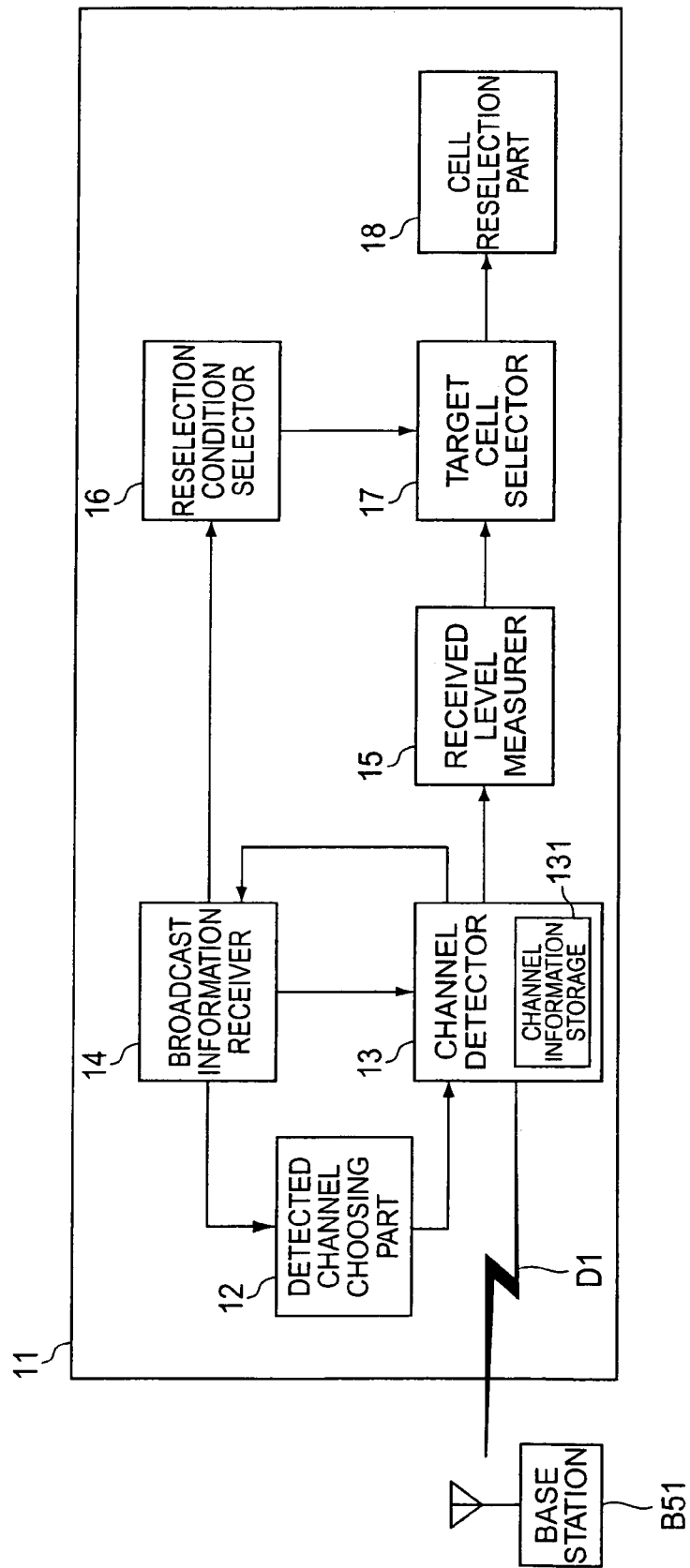
FIG. 12 is a block diagram showing the functional configuration of the mobile station in the second embodiment.

The mobile station, which is a principal component of the mobile communication system in the present embodiment, will be detailed below. FIG. 12 is a block diagram showing a functional configuration of mobile station 11. As shown in FIG. 12, mobile station 11 is provided with at least detected channel choosing part 12 (corresponding to the choosing means), channel detecting part 13, broadcast information receiving part 14 (corresponding to the determining means), received level measuring part 15 (corresponding to the measuring means), reselection condition selecting part 16, target cell selecting part 17 (corresponding to the selecting means), and cell reselection part 18. Channel detecting part 13 internally has channel information storage 131 (corresponding to the storing means).

Broadcast information receiving part 14 receives the broadcast information D1 via a radio channel and channel detecting part 13 from base station B51 establishing the serving cell C51 of mobile station 11. The broadcast information D1 contains the identification information indicating the cell type of cell C51, of course, and also contains the identification information indicating the cell types of cells C52, C61, C62, C71 neighbor to the cell C51. Broadcast information receiving part 14 determines the cell types of the respective cells, based on these identification information. Broadcast information receiving part 14 may be configured to determine the cell types of cells C51, C52, C61, C62, C71 on the basis of information preliminarily stored in channel information storage 131, without depending upon the broadcast information D1.

Channel information storage 131 of channel detecting part 13 stores information about a plurality of radio channels. Channel detecting part 13 detects a channel on the basis of the information stored in channel information storage 131. In a potential configuration, detected channel choosing part 12 chooses channels (detected channels) as targets for measurement of the received level and notifies channel detecting part 13 of there result thereof. This enables channel detecting part 13 to detect only one channel or a limited number of channels.

Received level measuring part 15 measures the received levels of the respective cells C51, C61, C62, C73, which were detected by channel detecting part 13. This permits mobile station 11 to measure the received levels about all the cells to which the mobile station itself can reselect.

Reselection condition selecting part 16 selects a reselection condition on the basis of the cell types of the serving cell C51 and neighboring cells C61, C62, C73 notified of by broadcast information receiving part 14, and notifies target cell selecting part 17 of the reselection condition thus selected.

Target cell selecting part 17 selects a target cell optimal for mobile station 11, based on the received levels of the respective cells measured by received level measuring part 15 and the reselection condition selected by reselection condition selecting part 16. The selection of the target cell herein includes in the determination on the propriety of the cell reselection itself and, even in the case where the target cell is selected, the reselection of the selected cell does not always have to be executed.

Figure 13:
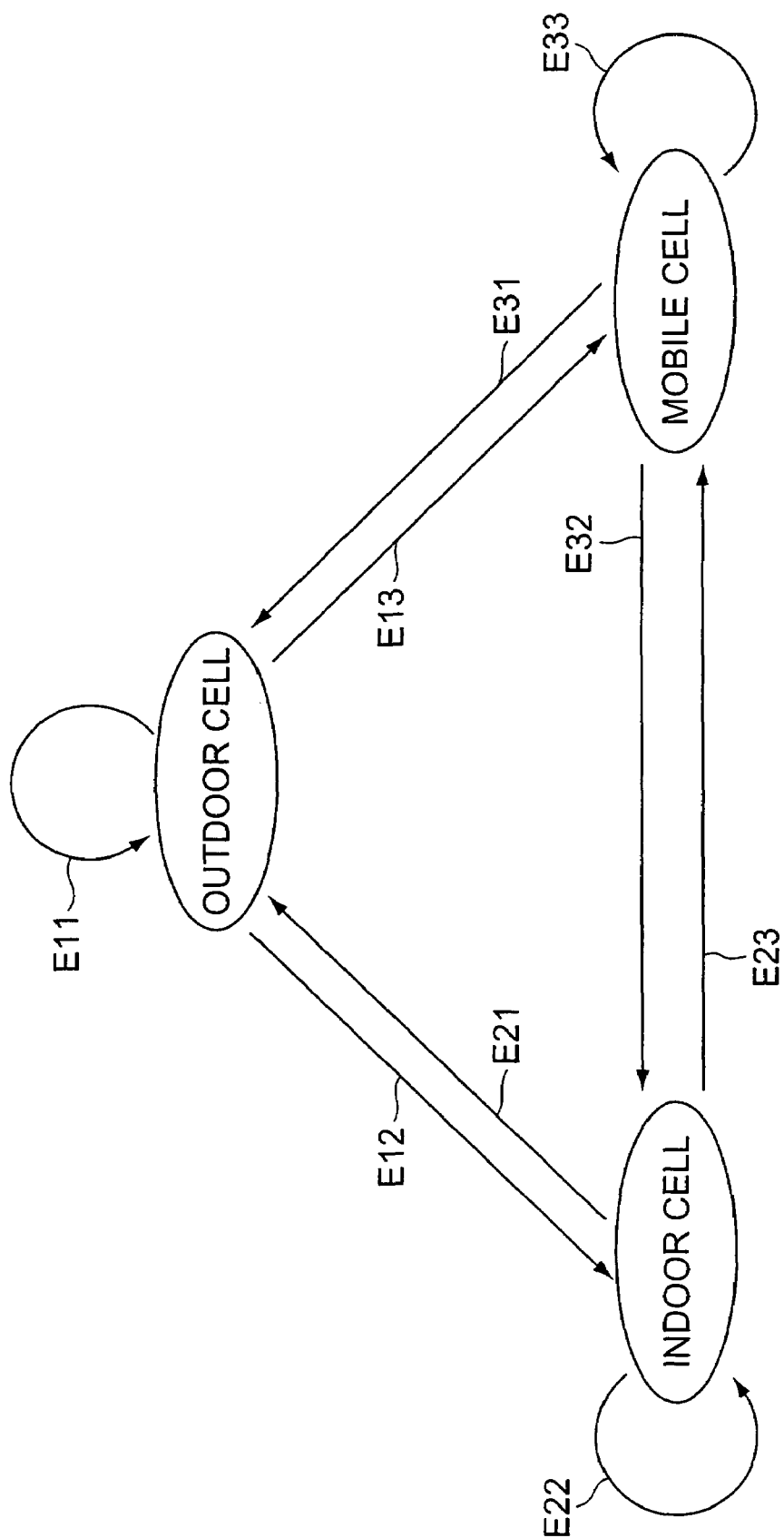
FIG. 13 is an illustration conceptually showing the relation between the cell types of the serving cell and neighboring cell and the cell reselection conditions.

An example of the relation between cell types and cell reselection conditions in the present embodiment is presented in FIG. 13. In FIG. 13, solid arrows E11-E33 represent reselection conditions from the serving cell to a neighboring cell. A starting point of each arrow indicates a type of the serving cell, and an end point of each arrow a type of a neighboring cell. The reselection conditions E11-E33 are held in reselection condition selecting part 16, and a reselection condition is selected based on the types of the serving cell and neighboring cells notified of by broadcast information receiving part 14. Target cell selecting part 17 is notified of the reselection condition thus selected.

FIG. 14 is a diagram showing the detailed contents of the reselection conditions according to the cell types, selection priorities among cell types, and relations among them. As shown in FIG. 14, there selection conditions E11-E32 are correlated with three types of reselection conditions, that is, the reselection conditions E21, E31, E32 are set to be a condition that "when the received level of the serving cell becomes below a predetermined threshold, a neighboring cell with the highest received level is selected as a target cell out of neighboring cells satisfying a predetermined received level." The reselection conditions E11, E22 are set to be a condition that "a neighboring cell a difference of the received level of which from that of the serving cell exceeds a predetermined hysteresis and which has the highest received level is selected as a target cell." Furthermore, the reselection conditions E12, E13, E23 are set to be a condition that "a neighboring cell the received level of which is continuously kept high for a predetermined time is selected as a target cell, regardless of the received level of the serving cell."

The reselection condition of E33 is set to be a condition that "no cell reselection is carried out between mobile cells." This is implemented by a first or second technique described below. The first technique is a method in which where mobile station 11 is camped on mobile cell C71 in FIG. 11 and even if the mobile cell C72 becomes a neighboring cell to mobile cell C71 because of movement of mobile cell C72 into the range of outdoor cell C51, the radio device W71 forming the mobile cell C71 does not notify mobile station 11 that the mobile cell C72 is a neighboring cell. The second technique is a method in which mobile station 11 camped on mobile cell C71 does not select the mobile cell C72 as a cell of a channel detection target.

Subsequently, the following will describe the reasons why mobile station 11 becomes able to select a cell optimal for communication, by the setting of the above reselection condition according to the cell type.

(1) The reason why, in the case of the serving cell being an outdoor cell and the neighboring cell being an outdoor cell, the reselection condition E11 is set to be "the reselection condition that the target cell is defined as a neighboring cell the difference of the received level of which from that of the serving cell exceeds the predetermined hysteresis and which has the highest received level" is as follows. In this case, the cell type of the neighboring cell is the same as that of the serving cell, which is nothing different from the form of the conventional mobile communication systems. Therefore, the present embodiment can also simply apply the cell reselection condition commonly used in the conventional mobile communication systems. Namely, target cell selecting part 17 of mobile station 11 selects as a target cell a cell with the highest received level out of outdoor cells the received level difference of which from that of the current outdoor cell exceeds the predetermined hysteresis (e.g., 6 dB) and which are neighbor to the current outdoor cell.

(2) The reason why, in the case of the serving cell being an outdoor cell and the neighboring cell being an indoor cell, the reselection condition E12 is set to be "the reselection condition that the target cell is defined as a neighboring cell the received level of which is kept high for the fixed time, regardless of the received level of the serving cell" is as follows. Namely, since a base station of an indoor cell has a smaller transmission power than a base station of an outdoor cell, the cell radius of the indoor cell is expected to be smaller than that of the outdoor cell. In addition, the indoor cell provides high-speed communication than the outdoor cell. For this reason, regardless of the quality of the current outdoor cell, faster communication can be expected by performing the reselection of the indoor cell and communication therein as long as the quality of the indoor cell is kept at or above the fixed value. It is, however, probable that mobile station 11 reselecting while camping in the outdoor cell detects a neighboring cell with a high received level but passes the range of the neighboring cell in moment. Therefore, target cell selecting part 17 of mobile station 11 selects as a target cell a neighboring indoor cell the received level of which is kept high (e.g., the signal to interference noise ratio of not less than 3 dB) for the predetermined time (e.g., 5 seconds), regardless of the level difference between the current outdoor cell and the neighboring indoor cell. This permits mobile station 11 to reselect the indoor cell only if it stays in the range of the indoor cell for the fixed time, whereby it is feasible to prevent the mobile station from frequently reselection between the outdoor cell and the indoor cell. As a consequence, it is feasible to prevent the discontinuation of data transmission due to highly frequent cell reselections and thus prevent the decrease of data transmission rates.

(3) The reason why, in the case of the serving cell being an outdoor cell and the neighboring cell being a mobile cell, the reselection condition E13 is set to be "the reselection condition that the target cell is defined as a neighboring cell the received level of which is kept high for the fixed time, regardless of the received level of the serving cell" is as follows. First, a mobile cell is not always fixed at a specific site, in view of the property thereof. It is, therefore, probable that while mobile station 11 is stationary in a current outdoor or indoor cell, a mobile cell can pass in its neighborhood so that the received level of the mobile cell becomes instantaneously higher than that of the serving cell. The level difference between the outdoor cell and the mobile cell at this time differs depending upon the location of mobile station 11. A conceivable situation suitable for the reselection of mobile station 11 to the mobile cell is, for example, that a man (mobile station 11) waits for a train (mobile cell) on the platform, the desired train arrives at the platform, and the man steps onto the train. Then target cell selecting part 17 of mobile station 11 selects as a target cell the mobile cell the received level of which is kept high (e.g., the signal to interference noise ratio of not less than 3 dB) for the predetermined time (e.g., 10 seconds), regardless of the level difference between the current outdoor cell and the neighboring mobile cell. This causes mobile station 11 to reselect the mobile cell only if it continuously stays in the mobile cell during a period of not less than the predetermined time. It is thus feasible to prevent mobile station 11 from reselecting the mobile cell merely passing by mobile station 11. As a result, it is feasible to prevent the discontinuation of data transmission due to highly frequent cell reselections and prevent the decrease of data transmission rates.

(4) The reason why, in the case of the serving cell being an indoor cell and the neighboring cell being an outdoor cell, the reselection condition E21 is set to be "the reselection condition that the target cell is defined as a neighboring cell with the highest received level out of neighboring cells satisfying the predetermined received level, when the received level of the serving cell becomes below the predetermined value" is as follows. Namely, because the radius of the indoor cell is smaller than that of the outdoor cell and because the indoor environment includes less disturbance factors than the outdoor environment, it is considered that good communication quality can be stabilized in the indoor cell. Therefore, target cell selecting part 17 of mobile station 11 selects as a target cell a cell with the highest received level out of neighboring outdoor cells satisfying the predetermined received level (e.g., the signal to interference noise ratio of 5 dB) only when the received level of the current indoor cell becomes below the predetermined threshold (e.g., the signal to interference noise ratio of 3 dB). By setting the tight reselection condition than the after-described reselection condition E22 (in the case of the serving cell and neighboring cell both being indoor cells) in this way, it becomes feasible to prevent frequent reselections from the indoor cell to the outdoor cell.

(5) The reason why, in the case of the serving cell being an indoor cell and the neighboring cell being an indoor cell, the reselection condition E22 is set to be "the reselection condition that the target cell is defined as a neighboring cell the difference of the received level of which from that of the serving cell exceeds the predetermined hysteresis and which has the highest received level" is as follows. In this case, the cell type of the neighboring cell is the same as that of the serving cell, which is nothing different from the form of the conventional mobile communication systems. Therefore, the present embodiment can also suitably apply the cell reselection condition commonly used in the conventional mobile communication systems. Namely, target cell selecting part 17 of mobile station 11 selects as a target cell a cell with the highest received level out of indoor cells the received level difference of which from that of the current indoor cell exceeds the predetermined hysteresis (e.g., 6 dB) and which are neighbor to the current indoor cell.

(6) The reason why, in the case of the serving cell being an indoor cell and the neighboring cell being a mobile cell, the reselection condition E23 is set to be "the reselection condition that the target cell is defined as a neighboring cell the received level of which is kept high for the fixed time, regardless of the received level of the serving cell" is as follows. First, a mobile cell is not always fixed at a specific site, in view of the property thereof. It is, therefore, probable that while mobile station 11 is stationary in a current outdoor or indoor cell, a mobile cell can pass in its neighborhood so that the received level of the mobile cell becomes instantaneously higher than that of the serving cell. The level difference between the indoor cell and the mobile cell at this time differs depending upon the location of mobile station 11. A conceivable situation suitable for the reselection of mobile station 11 to the mobile cell is, for example, that a man (mobile station 11) waits for a train (mobile cell) on the platform (e.g., where an outdoor base station cannot establish a cell as on the subway platform, the platform is in a cell range of an indoor cell), the desired train arrives at the platform, and the man steps onto the train. Then target cell selecting part 17 of mobile station 11 selects as a target cell the mobile cell the received level of which is kept high (e.g., the signal to interference noise ratio of not less than 3 dB) for the predetermined time (e.g., 10 seconds), regardless of the level difference between the current indoor cell and the neighboring mobile cell. This permits mobile station 11 to reselect the mobile cell only if it stays in the mobile cell during a period of not less than the predetermined time. It is thus feasible to prevent mobile station 11 from reselecting the mobile cell merely passing by mobile station 11. As a result, it is feasible to prevent the discontinuation of data transmission due to excessively high frequency of cell reselections and, besides, prevent the decrease of data transmission rates.

(7) The reason why, in the case of the serving cell being a mobile cell and the neighboring cell being an outdoor cell, the reselection condition E31 is set to be "the reselection condition that the target cell is defined as a neighboring cell with the highest received level out of neighboring cells satisfying the predetermined received level, when the received level of the serving cell becomes below the predetermined first threshold" is as follows. Namely, a mobile cell is not always fixed at a specific site, in terms of the property thereof. For this reason, as the mobile cell moves, the received levels of signals from the neighboring cells received at mobile station 11 in the mobile cell vary with time. It is practically quite unlikely that mobile station 11 in the mobile cell moves at high speed inside the mobile cell, and it is expected that there is little change in the received level of the signal from the serving cell received at mobile station 11 in the mobile cell. It is, therefore, contemplated that the desirable timing of the cell reselection of mobile station 11 in the mobile cell is a point of degradation of the received level in the current mobile cell, i.e., a time of movement from the interior of the mobile cell to the outside of the mobile cell (e.g., when the man gets off the train). Therefore, target cell selecting part 17 of mobile station 11 selects as a target cell a cell with the highest received level out of neighboring outdoor cells satisfying the predetermined received level (e.g., the signal to interference noise ratio of 5 dB) only if the received level of the current mobile cell becomes below the predetermined threshold (e.g., the signal to interference noise ratio of 3 dB). This can prevent mobile station 11 in the mobile cell from reselecting neighboring cells even if the received levels of signals from neighboring indoor and outdoor cells vary with time during movement of the mobile cell.

(8) The reason why, in the case of the serving cell being a mobile cell and the neighboring cell being an indoor cell, the reselection condition E32 is set to be "the reselection condition that the target cell is defined as a neighboring cell with the highest received level out of neighboring cells satisfying the predetermined received level, when the received level of the serving cell becomes below the predetermined first threshold" is as follows. Namely, a mobile cell is not always fixed at a specific site, in terms of the property thereof. For this reason, as the mobile cell moves, the received levels of signals from the neighboring cells received at mobile station 11 in the mobile cell vary with time. It is practically quite unlikely that mobile station 11 in the mobile cell moves at high speed inside the mobile cell, and it is expected that there is little change in the received level of the signal from the serving cell received at mobile station 11 in the mobile cell. It is, therefore, contemplated that the desirable timing of the cell reselection of mobile station 11 in the mobile cell is a point of degradation of the received level in the current mobile cell, i.e., a time of movement from the interior of the mobile cell to the outside of the mobile cell (e.g., when the man gets off the train). Therefore, target cell selecting part 17 of mobile station 11 selects as a target cell a cell with the highest received level out of neighboring indoor cells satisfying the predetermined received level (e.g., the signal to interference noise ratio of 5 dB) only if the received level of the current mobile cell becomes below the predetermined threshold (e.g., the signal to interference noise ratio of 3 dB). This can prevent mobile station 11 in the mobile cell from reselecting neighboring cells even if the received levels of signals from neighboring indoor and outdoor cells vary with time during movement of the mobile cell.

(9) The reason why, in the case of the serving cell being a mobile cell and the neighboring cell being a mobile cell, the reselection condition E33 is set to be "no cell reselection is conducted between mobile cells" is as follows. The reason for the setting of the reselection condition E33 is as follows. There can arise such a situation that mobile station 11 (man) moves from a mobile cell (train) to another mobile cell (train), for example, when the man changes the trains at the platform. However, a reselection of mobile station 11 between mobile cells passing each other is unlikely to occur, and it is thus undesirable to perform the cell reselection operation on the basis of the received level difference between mobile cells. Therefore, no cell reselection is conducted between mobile cells in such cases, as described above. This can be implemented by a method of keeping the mobile cell from announcing the information about the other mobile cell of the neighboring cell to mobile station 11 or a method of keeping mobile station 11 camped on the mobile cell from identifying another mobile cell as a target for detection of channel.

Furthermore, with reference to FIG. 14, the priorities, which are ranks for execution of the cell reselection determination process, are different among types of neighboring cells. According to FIG. 14, for example, where the serving cell is an outdoor cell, mobile station 11 first performs a determination on a reselection of an indoor cell with the priority of 1. When the determination on the reselection of the indoor cell results in finding no cell as a candidate, mobile station 11 executes the reselection determination process on a reselection of a mobile cell with the priority of 2. Furthermore, when the determination on the reselection of the mobile cell results in finding no cell as a candidate, mobile station 11 executes the reselection determination process on a reselection of a neighboring outdoor cell, as the last reselection determination process. In the case where the serving cell is an indoor cell, the cell reselection determination is also carried out similarly in the order of the priorities.

In the mobile communication system 200 of the second embodiment, as described above, mobile station 11 properly changes the cell reselection condition according to the types of the serving cell and neighboring cell and properly changes the priorities of the target neighboring cells according to the type of the serving cell. This permits the mobile station 11 to select a cell optimal for communication of its own, as a target cell.

The mode described in the present embodiment, particularly, the relation among the cell types, reselection conditions, and priorities, is just a preferred example of the mobile communication system according to the present invention, and it is noted that the present invention is by no means intended to be limited to the above mode.

For example, the above second embodiment was described based on the mode in which the same radio communication system was used in all the cells, but the cell selection technology according to the present invention is also applicable to cases where different radio communication systems are used depending upon cells. Namely, the cell selection technology according to the present invention is also applicable to a case where a radio communication system P (e.g., CDMA) is used in outdoor cells C51, C52 and indoor cells C61, C62, C63 and another radio communication system Q (e.g., OFDM) in mobile cells C71, C72.

A process specific to such a mode will be described below, again referring to FIGS. 11 and 12. Base station B51 transmits to mobile station 11 the information (identification information) enabling identification of each cell, either an indoor cell, an outdoor cell, or a mobile cell (corresponding to the cell type) and information about the physical layer (physical layer information) indicating which radio communication system is applied, in addition to the information that outdoor cell C52, indoor cells C61, C62, and mobile cell C71 exist as neighboring cells.

Namely, base station B51 notifies mobile station 11 of the broadcast information D1 which collectively contains the identification information indicating the cell type of its own cell C51, the identification information indicating that the neighboring cell C52 is an outdoor cell, the identification information indicating that the neighboring cells C61, C62 are indoor cells, the identification information indicating that the neighboring cell C71 is a mobile cell, the physical layer information indicating that the radio communication system used in the neighboring cells C52, C61, C62 is the radio communication system P, and the physical layer information indicating that the radio communication system used in the neighboring cell C71 is the radio communication system Q.

Mobile station 11 analyzes the broadcast information D1 at broadcast information receiving part 14 to find out that the radio communication system used in the neighboring cells C52, C61, C62 is the radio communication system P and that the radio communication system used in the neighboring cell C71 is the radio communication system Q, and notifies the channel detecting part 13 and reselection condition selecting part 16 of the acknowledged information. Channel detecting part 13 detects the neighboring cells C52, C61, C62 by the radio communication system P and detects the neighboring cell C31 by the radio communication system Q.

On the other hand, reselection condition selecting part 16 selects an optimal cell reselection condition out of the cell reselection conditions E11-E33 according to the above procedure, while taking into account the use of the radio communication system P in the outdoor cell C52 and indoor cells C61, C62 and the use of the radio communication system Q in the neighboring cell C71. This permits mobile station 11 to select a cell optimal for communication as a target cell even in the case where the different radio communication systems are used according to the cell types.

Here the indoor cells applicable encompass cells formed by compact transceivers. The cells formed by compact transceivers are expected to increase in the future in conjunction with multiplexing and layering of cells by application of microcells in the fourth generation technology, wireless LAN, home networks, active radio tag networks, and so on. This provides the prospect of increase of indoor cells. In this case, however, mobile station 11 can be configured to measure the received levels of only cells judged as necessary by detected channel choosing part 12, without measuring the received levels of all the cells, and thus can efficiently perform the cell selecting process.

The second embodiment described above can also be modified in a modification form as described below. Namely, the reselection conditions E13, E23, E31, E32 are set to "a reselection condition that a neighboring cell is selected as a target cell if a variation per unit time of the received level of the serving cell exceeds a predetermined value and if the received level of the neighboring cell is not less than a predetermined value."

The following will describe the reason why the reselection conditions E13, E23, E31, E32 are set to the above reselection condition in the modification.

For example, the user of the mobile station moves from the platform (an indoor cell or an outdoor cell) onto the train, and as the train starts moving, the received level of the indoor cell or outdoor cell where the mobile station is camped, varies rapidly. In contrast to it, the received level of the cell established in the train with the user aboard (a mobile cell as a neighboring cell at this point) is expected to be stable at predetermined value. Therefore, the favorable timing of the cell reselection of the mobile station from the indoor cell or outdoor cell to the mobile cell is the time when the received level of the serving cell starts varying rapidly, i.e., the time when the train with the user aboard starts moving.

Immediately after the mobile station moves from the interior of the mobile cell to the outside of the mobile cell (e.g., as the user gets off the train onto the platform and then the train again starts moving), the received level of the mobile cell where the mobile station is camped, varies rapidly, whereas the received level of the cell on the platform where the user is standing (an outdoor cell or indoor cell being a neighboring cell at this point) is expected to be relatively stable. Therefore, the favorable timing of the cell reselection of the mobile station from the mobile cell to the indoor cell or outdoor cell is the time when the received level of the serving cell starts varying rapidly, i.e., the time when the train again starts moving.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile station comprising:
   a measuring device configured to measure received signal levels of a serving cell and respective neighboring cells thereto;
   a cell class determiner that is configured to determine respective cell types based on identification information transmitted from the serving cell;
   a cell selector configured to select a cell as a reselection target based on the signal levels measured by the measuring device and the cell types determined by the cell class determiner:
   a memory configured to store the cell types in relation with cell classes;
   a counter configured to count the number of reselections between cells of different cell classes; and
   a controller that changes the relation between the cell types and the cell classes in the memory to another when the number of reselections counted by the counter exceeds a predetermined value.

2. The mobile station according to claim 1, wherein the cell selector changes a cell reselection condition or priority for selection between cell types, according to the cell type of the serving cell determined by the cell class determiner.

3. The mobile station according to claim 2, wherein the cell selector changes the cell reselection condition, according to the cell type of the neighboring cell determined by the cell class determiner.

4. A mobile communication system comprising:
   a mobile station comprising
   a memory configured to store the cell types in relation with cell classes,
   a counter configured to count the number of reselections between cells of different cell classes,
   a controller that changes the relation between the cell types and the cell classes in the memory to another when the number of reselections counted by the counter exceeds a predetermined value,
   a measuring device configured to measure received levels of a serving cell and each neighboring cell thereto,
   a cell class determiner configured to determine cell types of the current and neighboring cells, and
   a cell selector configured to select a cell as a reselection target, based on the received levels measured by the measuring device and the cell types determined by the cell class determiner; and
   a base station configured to notify the mobile station of identification information enabling identification of respective cell types of the base station and each neighboring cell thereto.

5. A cell selection method comprising:
   a measuring step wherein a mobile station measures received levels of a serving cell and each neighboring cell thereto;
   a determining step wherein the mobile station determines cell types of the current and neighboring cells;
   a selecting step wherein the mobile station selects a cell as a reselection target, based on the received levels measured in the measuring step and the cell types determined in the determining step, said determining step including a step of determining the cell types based on identification information transmitted from the serving cell;
   counting the number of reselections between cells of different cell classes; and
   changing a relation between the cell types and the cell classes in a memory to another when the number of reselections counted by the counting step exceeds a predetermined value.

6. The cell selection method according to claim 5, wherein in the changing step the relation between the cell types and the cell classes stored in memory is changed to another when the number of reselections exceeds the predetermined value within a predetermined time from a point of a start of counting the number of reselections.

7. The cell selection method according to claim 5, wherein in the changing step, on the occasion of changing the relation between the cell types and the cell classes, the changing step brings the relation back to that before the changing step after a lapse of a predetermined time from a point of the changing.

8. The mobile station according to claim 1, wherein the cell selector chooses neighboring cells for each of which a received level is measured,
   wherein the measuring device measures received levels of neighboring cells after the cell selector performs the choosing.

9. A mobile station comprising:
   a memory configured to store the cell types in relation with cell classes;
   a counter configured to count the number of reselections between cells of different cell classes;
   a controller that changes the relation between the cell types and the cell classes in the memory to another when the number of reselections counted by the counter exceeds a predetermined value, said a memory configured to store information about a radio channel;
   a choosing mechanism configured to choose neighboring cells for each of which a received level is measured;
   a measuring device configured to measure received levels of a serving cell and each neighboring cell after chosen by the choosing mechanism, out of the neighboring cells to the serving cell;
   a cell class determiner configured to determine cell types of the current and chosen neighboring cells; and
   a cell selector configured to select a cell as a reselection target, based on the received levels measured by the measuring device and the cell types determined by the cell class determiner,
   said cell class determiner configured to determine the cell types based on identification information transmitted from the serving cell.

10. The mobile station according to claim 9, wherein a cell reselection condition includes at least one of the following reselection conditions:
    a reselection condition that the target cell is determined to be a neighboring cell with the highest received level out of neighboring cells satisfying a predetermined received level when the received level of the serving cell becomes below a predetermined first threshold;
    a reselection condition that the target cell is determined to be a neighboring cell a difference of the received level of which from that of the serving cell exceeds a predetermined hysteresis and which has a highest received level;

a reselection condition that the target cell is determined to be a neighboring cell which keeps the received level high for a predetermined time, regardless of the received level of the serving cell; and a reselection condition that, when a variation per unit time of the received level of the serving cell exceeds a predetermined second threshold, the target cell is determined to be a neighboring cell with the highest received level out of neighboring cells the received level of each of which exceeds a predetermined third threshold.

11. A cell selection method comprising:

counting a number of reselections between cells of different cell classes;

changing a relation between the cell types and the cell classes in a memory to another when the number of reselections counted by the counting step exceeds a predetermined value;

storing at a mobile station information about a radio channel;

choosing at the mobile station neighboring cells for each of which a received level is measured;

measuring at the mobile station received levels of a serving cell and each neighboring cell after chosen in the choosing step, out of neighboring cells to the serving cell;

determining at the mobile station cell types of the current and chosen neighboring cells; and selecting at the mobile station a cell as a reselection target, based on the received levels measured in the measuring step and the cell types determined in the determining step, said determining step determines the cell types based on identification information transmitted from the serving cell.

12. The cell selection method according to claim 11, wherein a cell reselection condition includes at least one of the following reselection conditions:

a reselection condition that the target cell is determined to be a neighboring cell with the highest received level out of neighboring cells satisfying a predetermined received level when the received level of the serving cell becomes below a predetermined first threshold;

a reselection condition that the target cell is determined to be a neighboring cell a difference of the received level of which from that of the serving cell exceeds a predetermined hysteresis and which has a highest received level;

a reselection condition that the target cell is determined to be a neighboring cell which keeps the received level high for a predetermined time, regardless of the received level of the serving cell; and a reselection condition that, when a variation per unit time of the received level of the serving cell exceeds a predetermined second threshold, the target cell is determined to be a neighboring cell with the highest received level out of neighboring cells the received level of each of which exceeds a predetermined third threshold.

* * * * *